United States Patent
Li

(10) Patent No.: US 10,656,654 B2
(45) Date of Patent: May 19, 2020

(54) METHOD AND APPARATUS FOR LOCALIZATION AND MAPPING BASED ON COLOR BLOCK TAGS

(71) Applicant: GUANGZHOU AIROB ROBOT TECHNOLOGY CO., LTD., Guangzhou, Guangdong (CN)

(72) Inventor: Beichen Li, Guangdong (CN)

(73) Assignee: GUANGZHOU AIROB ROBOT TECHNOLOGY CO., LTD., Guangzhou (CN)

(*) Notice: Subject to any disclaimer, the term of this patent is extended or adjusted under 35 U.S.C. 154(b) by 329 days.

(21) Appl. No.: 15/657,263

(22) Filed: Jul. 24, 2017

(65) Prior Publication Data
US 2017/0329343 A1 Nov. 16, 2017

Related U.S. Application Data

(63) Continuation of application No. PCT/CN2015/071362, filed on Jan. 22, 2015.

(51) Int. Cl.
*G05D 1/02* (2020.01)
*G01S 5/02* (2010.01)
*G06K 19/00* (2006.01)
*G01S 5/16* (2006.01)
*G01S 17/931* (2020.01)
*G01S 1/70* (2006.01)
*G06K 7/14* (2006.01)

(52) U.S. Cl.
CPC ............ *G05D 1/0234* (2013.01); *G01S 5/02* (2013.01); *G01S 5/0252* (2013.01); *G01S 5/16* (2013.01); *G01S 17/931* (2020.01); *G05D 1/02* (2013.01); *G05D 1/0214* (2013.01); *G05D 1/0219* (2013.01); *G06K 19/00* (2013.01); *G01S 1/70* (2013.01); *G05D 2201/0217* (2013.01); *G06K 7/1408* (2013.01)

(58) Field of Classification Search
CPC . G01S 5/02; G01S 5/0252; G01S 5/16; G01S 17/936; G05D 1/02; G05D 1/0214; G05D 1/0219; G06K 19/00
USPC .......................................................... 701/26
See application file for complete search history.

(56) References Cited

U.S. PATENT DOCUMENTS 7,693,654 B1 * 4/2010 Dietsch ................. G01C 21/20
                                                        701/461
8,948,913 B2 * 2/2015 Choi ..................... B25J 9/1664
                                                        318/568.12

(Continued)

*Primary Examiner* — Thomas G Black
*Assistant Examiner* — Luke Huynh

(57) ABSTRACT

The present invention discloses a method and an apparatus for localization and mapping based on color block tags, applicable for real-time mapping of an area to be localized in which at least one color block tag is arranged, the method comprises: taking a location of a first color block tag as a coordinate origin of a coordinate system when information of the first color block tag is obtained by a mobile electronic device; moving the mobile electronic device to start to traverse the entire area to be localized from the coordinate origin, calculating coordinates of an obstacle detected by the mobile electronic device based on a location of the mobile electronic device relative to the coordinate origin; constructing a map based on recorded information of the color block tags and coordinates thereof and the coordinates of each obstacle when the traversal has been finished.

19 Claims, 14 Drawing Sheets

(56) References Cited

U.S. PATENT DOCUMENTS

| | | | | |
|---|---|---|---|---|
| 2009/0055020 A1* | 2/2009 | Jeong | ................... | G05D 1/0246 |
| | | | | 700/251 |
| 2009/0149990 A1* | 6/2009 | Myeong | ............... | G05D 1/0274 |
| | | | | 700/245 |
| 2011/0010033 A1* | 1/2011 | Asahara | ................. | G05D 1/024 |
| | | | | 701/26 |
| 2014/0207374 A1* | 7/2014 | Taylor, Jr. | .............. | G01C 21/16 |
| | | | | 701/470 |
| 2014/0379196 A1* | 12/2014 | Da Rocha | ............ | A01D 34/008 |
| | | | | 701/26 |

* cited by examiner taking a location of a first color block tag as a coordinate origin of a coordinate system when information of the first color block tag is obtained by a mobile electronic device which is moving along a certain trajectory for a first time, and recording the information of the first color block tag and coordinate values thereof — 21 moving the mobile electronic device with the coordinate origin as a starting point to traverse all over the area to be localized — 22 calculating and recording coordinate values of a location of an obstacle based on a moving direction and a moving distance of the mobile electronic device relative to the starting point when the mobile electronic device detects the obstacle each time during the traversa — 23 calculating coordinate values of location of other color block tag except the first color block tag each time when the mobile electronic device obtains information of the other color block tag based on the moving direction and the moving distance of the mobile electronic device relative to the starting point during the traversal — 24 constructing a map according to recorded information of the color block tags and coordinate values thereof and the coordinate values of the location of each said obstacle when the traversal has been finished — 25

Fig. 2

```
┌─────────────────────────────────────────────────────┐
│ aking a location of a first color block tag as a    │
│ coordinate origin of a coordinate system when       │ 41
│ information of the first color block tag is         │
│ obtained by a mobile electronic device which is     │
│ moving along a certain trajectory for a first time, │
│ and recording the information of the first color    │
│ block tag and coordinate values thereof             │
└─────────────────────────────────────────────────────┘
                          ↓
┌─────────────────────────────────────────────────────┐
│ moving the mobile electronic device with the        │ 42
│ coordinate origin as a starting point to traverse   │
│ all over the area to be localized                   │
└─────────────────────────────────────────────────────┘
                          ↓
┌─────────────────────────────────────────────────────┐
│ calculating and recording coordinate values of a    │
│ location of an obstacle based on a moving direction │ 43
│ and a moving distance of the mobile electronic      │
│ device relative to the starting point when the      │
│ mobile electronic device detects the obstacle each  │
│ time during the traversal                           │
└─────────────────────────────────────────────────────┘
                          ↓
┌─────────────────────────────────────────────────────┐
│ calculating coordinate values of location of other  │
│ color block tag except the first color block tag    │ 44
│ each time when the mobile electronic device obtains │
│ information of the other color block tag based on a │
│ moving direction and a moving distance of the       │
│ mobile electronic device relative to the starting   │
│ point during the traversal                          │
└─────────────────────────────────────────────────────┘
                          ↓
┌─────────────────────────────────────────────────────┐
│ constructing a map according to recorded            │ 45
│ information of the color block tags and coordinate  │
│ values thereof and the coordinate values of the     │
│ location of each obstacle when the traversal has    │
│ been finished                                       │
└─────────────────────────────────────────────────────┘
                          ↓
┌─────────────────────────────────────────────────────┐
│ enabling the mobile electronic device to traverse   │
│ all over the area to be localized for multiple      │ 46
│ times with the coordinate origin as the starting    │
│ point, and correcting the coordinate values of each │
│ said color block tag by using a correction          │
│ algorithm based on the coordinate values of each    │
│ said color block tag obtained from traversal for    │
│ each time                                           │
└─────────────────────────────────────────────────────┘
                          ↓
┌─────────────────────────────────────────────────────┐
│ correcting constructed map based on corrected       │ 47
│ coordinate values                                   │
└─────────────────────────────────────────────────────┘
```

Fig. 4

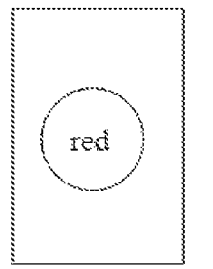 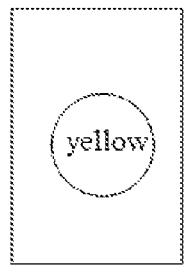 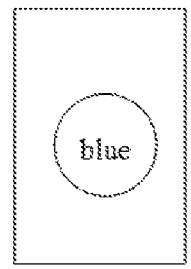
color block tag 1   color block tag 2   color block tag 3
Fig. 11 a
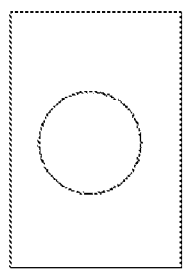 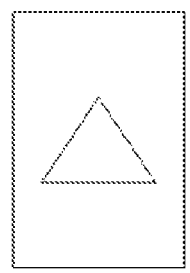 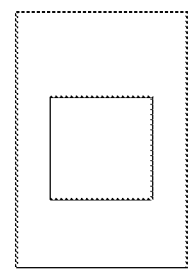
color block tag 1   color block tag 2   color block tag 3
Fig. 11 b
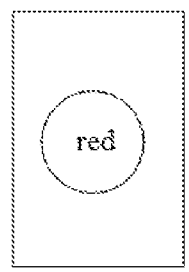 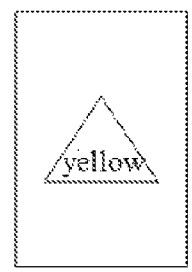 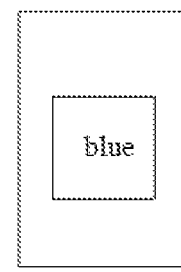
color block tag 1   color block tag 2   color block tag 3
Fig. 11 c

METHOD AND APPARATUS FOR LOCALIZATION AND MAPPING BASED ON COLOR BLOCK TAGS

CROSS-REFERENCE TO RELATED APPLICATIONS

The present application is a Continuation Application of PCT application No. PCT/CN2015/071362 filed on Jan. 22, 2015, the contents of which are hereby incorporated by reference.

FIELD OF THE INVENTION

The present invention relates to the simultaneous localization and mapping field, more particularly to a method and an apparatus for localization and mapping based on color block tags.

BACKGROUND OF THE INVENTION

The localization and mapping of mobile devices is a hot spot in the field of robot. There has been a practical solution to the self-localization of mobile devices in known environments and mapping with known locations of robots. However, in many environments the mobile device can't be localized by using global location system, moreover it is difficult or even impossible to obtain the map of the mobile device's working environment in advance. Hence the mobile device needs to build the map in a completely unknown environment under the condition that its position is uncertain, and use the map to locate and navigate autonomously. This is so-called simultaneous localization and mapping (SLAM).

According to the simultaneous localization and mapping (SLAM), the mobile device identifies characteristic indications in an unknown environment by utilizing sensors in the mobile device, and the global coordinates of the mobile device and the characteristic indications are estimated according to the relative position between the mobile device and the characteristic indication and the reading of the encoder.

So far, the most common exiting positioning techniques of automatic walking robots or devices are:

(1) GPS positioning; the basic principle of GPS positioning is based on instantaneous position of the satellite moving with high speed as a known starting data, and using the method of spatial distance resection to determine the location of the point to be measured.

(2) bar code positioning mode. To convert the bar code compiled according to certain rules into meaningful information, it is necessary to go through two processes of scanning and decoding. The color of the object is determined by the type of light it reflects, the white object can reflect the visible light of various wavelengths, the black object absorbs the visible light of various wavelengths, so when the light emitted by the bar code scanner light is reflected on the bar code, the reflected light is irradiated to the photoelectric converter within the bar code scanner, and the photoelectric converter converts reflected light signal into the corresponding electrical signal on the basis of different strength of the reflected light signal. According to difference principles, the scanner can be divided into three types: light pen, CCD and laser. After being output to the amplifying circuit enhancement signals of the bar-code scanner, the electric signals are transmitted to the shaping circuit to convert the analog signals into digital signals. The width of the black bars and black bars is different, hence the duration of the corresponding electrical signals is different. Then the decoder determines the number of bars and nulls by measuring the number of pulse digital electrical signals 0f 0 and 1. The width of the bar and the empty is determined by measuring the duration of the 0,1 signal. But the obtained data is still chaotic, in order to know the information contained in the bar code, it is necessary to convert the bar symbol into the corresponding number information and character information based on the corresponding coding rules (such as: EAN-8 yards). Finally, the details of the items will be identified through data processing and management by computer system.

The positioning technique above applied in automatic walking robot or automatic walking equipment is relatively complex, each with different shortcomings:
1. GPS positioning is not practical due to signal problems in the room.
2. The bar code positioning mode is limited in usage occasions due to the fact that the bar codes are easily polluted and can not be read.

Positioning and navigation technique of the mobile robot in the indoor environment has the characteristics of high precision and complicated environment for positioning, so the methods above are not applicable.

SUMMARY OF THE INVENTION

The present invention aims to provide a method and an apparatus for localization and mapping based on color block tags, which can effectively solve the problem of cumbersome operation and high cost according to the exiting technique.

The present invention provides a method for localization and mapping based on color block tags, and the method comprises steps of:
taking a location of a first color block tag as a coordinate origin of a coordinate system when information of the first color block tag is obtained by a mobile electronic device which is moving along a certain trajectory for a first time, and recording the information of the first color block tag and coordinate values thereof;
moving the mobile electronic device with the coordinate origin as a starting point to traverse all over the area to be localized, calculating and recording coordinate values of a location of an obstacle based on a moving direction and a moving distance of the mobile electronic device relative to the starting point when the mobile electronic device detects the obstacle each time during the traversal;
constructing a map according to recorded information of the color block tag and coordinate values thereof and the coordinate values of the location of each said obstacle when the traversal has been finished.

According to another embodiment of the present invention, the number of the color block tag is two or more, and each said color block tag is correspondingly arranged at a specific position of the area to be localized, and the information of each said color block tag comprises unique coding information used for distinguishing an absolute position thereof, the unique coding information is represented by a plurality of different colors, different shapes, combination of different shapes and different colors or color blocks with different gray scales, and the method further comprises step of:

calculating coordinate values of location of other color block tag except the first color block tag each time when the mobile electronic device obtains information of the other color block tag based on a moving direction and a moving distance of the mobile electronic device relative to the starting point during the traversal, and recording the information of the other color block tag and the corresponding coordinate values.

According to another embodiment of the present invention, after constructing the map, the method further comprises steps of:

enabling the mobile electronic device to traverse all over the area to be localized for multiple times with the coordinate origin as the starting point, and correcting the coordinate values of each said color block tag by using a correction algorithm based on the coordinate values of each said color block tag obtained from traversal for each time;

correcting the constructed map based on corrected coordinate values.

According to another embodiment of the present invention, information of each said color block tag further comprises area coding information used for distinguishing an accessible area/a no-entry area, and a color block tag with the area coding information of the no-entry area limits a specific area behind a boundary where the color block tag is localized as the no-entry area, the area coding information can represent the accessible area by a same color/a same shape/combination of a same shape and a same color, the area coding information can represent the no-entry area by another color/another shape/combination of another shape and another color, and the method further comprises step of:

identifying the area coding information in the information of the color block tag as the accessible area or as the no-entry area firstly when the mobile electronic device obtains the information of the color block tag, and then enabling the mobile electronic device to continue to move on to avoid the no-entry area according to a preset avoiding strategy if the no-entry area is identified.

As an improvement of the above-described embodiment, when the traversal has been finished, during the map-constructing process based on recorded information of the color block tags and the coordinate values thereof and the coordinate values of the location of each obstacle, making marks of the accessible area/no-entry area on the map being constructed according to the area coding information of each said color block tag.

As an improvement of the above-described embodiment, the coordinate values of the location of the obstacle are calculated when the mobile electronic device detects the obstacle each time in the following manners:

sensing the obstacle by using a collision sensor, and taking coordinate values of the mobile electronic device as the coordinate values of the location of the obstacle when the collision sensor senses a collision with the obstacle; or detecting the obstacle by using a laser sensor/an infrared sensor, and calculating the location of the obstacle relative to a current location of the mobile electronic device according to a calculation principle of laser/infrared distance when the laser sensor/infrared sensor detects the obstacle, thus calculating the coordinate values of the location of the obstacle.

As an improvement of the above-described embodiment, the method further comprises step of:

correcting each said moving direction and each said moving distance of the mobile electronic device relative to the starting point based on an angular velocity or/and an angle and an acceleration of the mobile electronic device, and coordinate values are obtained according to corrected moving direction and corrected moving distance of the mobile electronic device relative to the starting point.

As an improvement of the above-described embodiment, the location of each said color block tag is determined in the following manners:

when the mobile electronic device has sensed tag information of any one of the color block tags by using a color sensor, enabling the mobile electronic device to move in a direction in which strength of tag information of the color block tag is gradually increasing until the strength of the tag information of the color block tag sensed by the mobile electronic device is equal to or greater than a preset maximum value or the mobile electronic device collides with the color block tag, and then taking a current location of the mobile electronic device as the location of the color block tag.

As an improvement of the above-described embodiment, the location of each said color block tag is determined in the following manners:

when the mobile electronic device has sensed tag information of any one of the color block tags by using a camera, the location of the color block tag relative to the mobile electronic device is determined based on number of pixels obtained by projecting a pattern of the color block tag onto CCD, thereby calculating the coordinate values of the color block tag; or when the mobile electronic device read tag information of the color block tags by using a camera, enabling the mobile electronic device to move in a direction in which a pixel value obtained by projecting a pattern of a color block tag onto CCD is gradually increasing until the pixel value obtained by projecting the pattern of the color block tag onto the CCD reach a certain threshold or the mobile electronic device collides with the color block tag, and then taking a current location of the mobile electronic device as the location of the color block tag.

As an improvement of the above-described embodiment, when the mobile electronic device has collided with an obstacle during the traversal, enabling the mobile electronic device to continue to advance to avoid the obstacle according to a preset collision strategy;

the preset collision strategy is preferably:

enabling the mobile electronic device to retreat by M cm and rotate to the left/right by N° when a collision occurs, wherein $0<M<20$, $0<N<10$.

As an improvement of the above-described embodiment, the preset avoiding strategy comprises:

enabling the mobile electronic device to retreat by P cm and rotate to the left/right by Q° when the no-entry area is identified, wherein P is not less than the length of the boundary, $45 \leq Q \leq 90$.

As an improvement of the above-described embodiment, the mobile electronic device is a robot.

As an improvement of the above-described embodiment, the method is applicable for real-time mapping for an indoor area to be localized.

As an improvement of the above-described embodiment, the color block tag is arranged on a left and/or right side wall of a door frame.

The present invention provides an apparatus for localization and mapping based on color block tags, and the apparatus is applicable for real-time mapping of an area to be localized in which at least one color block tag is arranged, the apparatus for localization and mapping is a mobile electronic device, the mobile electronic device comprises:

a color sensor/camera, configured to read information of the color block tags;

a coordinate system constructing and recording unit, configured to take a location of a first color block tag as a coordinate origin of a coordinate system when information of the first color block tag is obtained by the color sensor/camera in the mobile electronic device which is moving along a certain trajectory for a first time, and record the information of the first color block tag and coordinate values thereof;

an encoder, configured to record a moving distance and a moving direction of the mobile electronic device relative to a starting point in real time when the mobile electronic device traverses all over the area to be localized with the coordinate origin as the starting point;

an obstacle detecting unit, configured to detect obstacle;

a first calculating unit, configured to calculate coordinate values of the location of each said obstacle based on the moving direction and the moving distance of the mobile electronic device relative to the starting point recorded by the encoder when the mobile electronic device detects the obstacle, and send the calculated coordinate values to the coordinate system constructing and recording unit;

a map constructing unit, configured to construct a map according to information of the color block tags and coordinate values thereof and the coordinate values of the location of each said obstacle recorded by the coordinate system constructing and recording unit.

As an improvement of the above-described embodiment, the number of the color block tags is two or more, and each said color block tag is correspondingly arranged at a specific position of the area to be localized, and information of each said color block tag comprises unique coding information used for distinguishing an absolute position thereof, the unique coding information is represented by a plurality of different colors, different shapes, combination of different shapes and different colors or color blocks with different gray scales, and the apparatus further comprises:

a second calculating unit, configured to calculate coordinate values of locations of other color block tag except the first color block tag each time when the mobile electronic device obtains information of the other color block tag based on the moving direction and the moving distance of the mobile electronic device relative to the starting point during the traversal, and send information of the other color block tag and the corresponding coordinate values to the coordinate system constructing and recording unit.

As an improvement of the above-described embodiment, the apparatus further comprises:

a second correcting unit, configured to correct the coordinate values of each said color block tag by using a correction algorithm after the mobile electronic device traverses all over the area to be localized for multiple times with the coordinate origin as the starting point according to the coordinate values of each said color block tag obtained from traversal for each time, and send corrected coordinate values to the map constructing unit to correct constructed map.

As an improvement of the above-described embodiment, information of each said color block tag further comprises area coding information used for distinguishing an accessible area/a no-entry area, and a color block tag with the area coding information of the no-entry area limits a specific area behind a boundary where the color block tag is localized as the no-entry area, the area coding information can represent the accessible area by a same color block/a same shape/combination of a same shape and a same color, the area coding information can represent the no-entry area by another color block/another shape/combination of another shape and another color, and the apparatus further comprises:

an area identifying unit, configured to identify the area coding information in information of the color block tag as the accessible area or as the no-entry area firstly when the mobile electronic device obtains the information of each said color block tag, and then enable the mobile electronic device to continue to move on to avoid the no-entry area according to a preset avoiding strategy if the no-entry area is identified.

As an improvement of the above-described embodiment, when the traversal has been finished, during the map-constructing process based on recorded information of the color block tags and the coordinate values thereof and the coordinate values of the location of each obstacle, making marks of the accessible area/no-entry area on the map being constructed according to the area coding information of each said color block tag.

As an improvement of the above-described embodiment, the obstacle detecting unit comprises a collision sensor, a laser sensor or an infrared sensor;

the first calculating unit takes calculated coordinate values of a current location of the mobile electronic device as the coordinate values of the location of the obstacle when the collision sensor senses a collision with the obstacle;

the laser sensor/the infrared sensor calculates the location of the obstacle relative to the current location of the mobile electronic device according to a calculation principle of laser/infrared distance when the laser sensor/the infrared sensor detects the obstacle, which is send to the first calculating unit; the first calculating unit calculates the coordinate values of the location of the obstacle based on the calculated coordinate values of the current location of the mobile electronic device and the location of the obstacle relative to the current location of the mobile electronic device.

As an improvement of the above-described embodiment, the apparatus further comprises:

a gyro sensor or/and an electronic compass and an accelerometer, configured to record an angular velocity or/and an angle and an acceleration of the mobile electronic device in real time respectively when the mobile electronic device traverses all over the area to be localized with the coordinate origin as the starting point; and a first correcting unit, configured to correct each said moving direction and said moving distance of the mobile electronic device relative to the starting point based on the angular velocity or/and the angle and the acceleration of the mobile electronic device;

the first calculating unit calculates the coordinate values of the location of each obstacle according to corrected moving direction and corrected moving distance of the mobile electronic device relative to the starting point.

As an improvement of the above-described embodiment, the apparatus further comprises:

a gyro sensor or/and an electronic compass and an accelerometer, configured to record an angular velocity or/and an angle and an acceleration of the mobile electronic device in real time respectively when the mobile electronic device traverses all over the area to be localized with the coordinate origin as the starting point; and a first correcting unit, configured to correct each said moving direction and each said moving distance of the mobile electronic device relative to the starting point based on the angular velocity or/and the angle and the acceleration of the mobile electronic device;

the first calculating unit calculates the coordinate values of each obstacle according to corrected moving direction and corrected moving distance of the mobile electronic device relative to the starting point;

the second calculating unit calculates the coordinate values of the location of the other color block tag according to the corrected moving direction and the corrected moving distance of the mobile electronic device relative to the starting point.

As an improvement of the above-described embodiment, when the mobile electronic device has sensed tag information of any one of the color block tags by using a color sensor, the mobile electronic device is enabled to move in a direction in which strength of tag information of the color block tag is gradually increasing until the strength of the tag information of the color block tag sensed by the mobile electronic device is equal to or greater than a preset maximum value or the mobile electronic device collides with the color block tag, and then taking a current location of the mobile electronic device as the location of the color block tag.

As an improvement of the above-described embodiment, when the mobile electronic device has sensed tag information of any one of the color block tags by using a camera, the location of the color block tag relative to the mobile electronic device is determined based on number of pixels obtained by projecting a pattern of the color block tag onto CCD, thereby calculating the coordinate values of the color block tag; or when the mobile electronic device read tag information of the color block tag by using a camera, enabling the mobile electronic device to move in a direction in which a pixel value obtained by projecting a pattern of the color block tag onto CCD is gradually increasing until the pixel value obtained by projecting the pattern of the color block tag onto the CCD reach a certain threshold or the mobile electronic device collides with the color block tag, and then taking a current location of the mobile electronic device as the location of the color block tag.

As an improvement of the above-described embodiment, the apparatus further comprises:

a collision strategy unit, configured to enable the mobile electronic device to continue to advance to avoid an obstacle when the mobile electronic device has collided with the obstacle during the traversal according to a preset collision strategy;

the preset collision strategy is preferably:

enabling the mobile electronic device to retreat by M cm and rotate to the left/right by N° when a collision occurs, wherein 0<M<20, 0<N<10.

As an improvement of the above-described embodiment, the preset avoiding strategy comprises:

enabling the mobile electronic device to retreat by P cm and rotate to the left/right by Q° when the no-entry area is identified, wherein P is not less than the length of the boundary, 45≤Q≤90.

As an improvement of the above-described embodiment, the mobile electronic device is a robot.

As an improvement of the above-described embodiment, the apparatus is applicable for real-time mapping for an indoor area to be localized.

As an improvement of the above-described embodiment, the color block tag is arranged on a left and/or right side wall of a door frame.

As an improvement of the above-described embodiment, a fixing groove is arranged on a left side and/or right side wall of a door frame, and the color block tag is set in the fixing groove.

The present invention provides an intelligent mobile device, comprising a mobile apparatus and the apparatus for localization and mapping based on color block tags as described above.

Compared with the exiting technique, the method and apparatus for localization and mapping based on color block tags disclosed by the present invention is achieved by arranging at least one color block tag in the area to be localized, and taking the location (of the color block tag) where the first color block tag is sensed by the mobile electronic device which moves for the first time as the coordinate origin of a coordinate system, then during the process of the mobile electronic device is moved to traverse all over the area to be localized with the coordinate origin as the starting point, calculating and recording the coordinate values of the location of the obstacle based on the moving direction and the moving distance of the mobile electronic device relative to the starting point when the mobile electronic device detects an obstacle each time, when the traversal has been finished, constructing a map on the basis of the recorded information of the color block tags and the coordinate values thereof and the coordinate values of the location of each obstacle. Therefore, the present invention needs only one or more color block tags to realize the localization and mapping of the area to be localized, and the method is simple and has the advantages of low cost, simple operation and effective technical results.

BRIEF DESCRIPTION OF THE DRAWINGS

FIG. 2 is a flowchart of a method for localization and mapping based on color block tags according to the second embodiment of the present invention;

FIG. 4 is a flowchart of a method for localization and mapping based on color block tags according to the forth embodiment of the present invention;

FIG. 11a, FIG. 11b and FIG. 11c show representations of three different color block tags, to act unique coding information used for distinguishing the absolute position thereof.

DETAILED DESCRIPTION OF ILLUSTRATED EMBODIMENTS

The technical solutions of the embodiments according to the present invention are clearly and fully described as below with reference to the accompanying drawings in the embodiments of the present invention. Apparently, the embodiments to be described are merely a part rather than all of the embodiments of the present invention. All other embodiments obtained by persons with ordinary skills in the art based on the embodiments of the present invention without creative efforts shall fall within the protection scope of the present invention.

Figure 1:
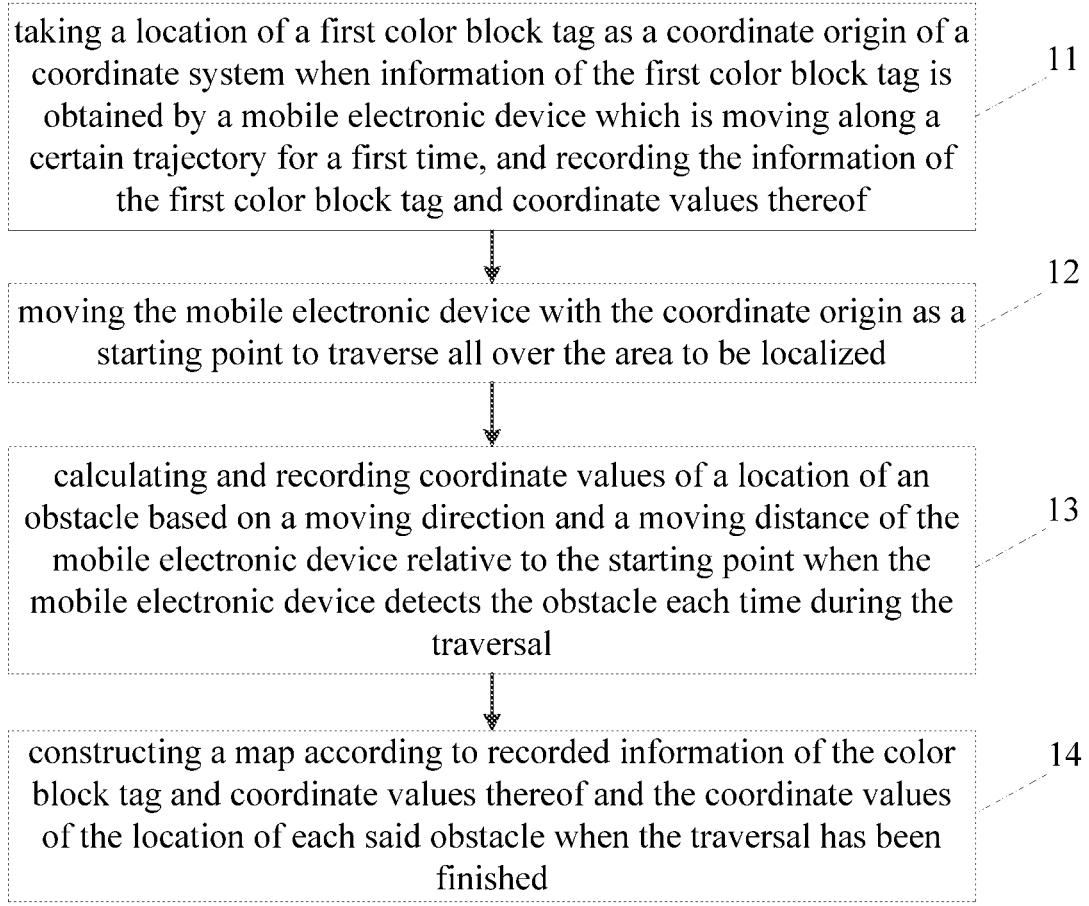
FIG. 1 is a flowchart of a method for localization and mapping based on color block tags according to the first embodiment of the present invention.

Referring to FIG. 1, it is a flowchart of a method for localization and mapping based on color block tags according to the first embodiment of the present invention. The method for localization and mapping based on color block tags is applicable for real-time mapping of an area to be localized in which at least one color block tag is arranged by utilizing a mobile electronic device, the mobile electronic device can be, for example, a robot.

The method for localization and mapping based on color block tags according to the present embodiment comprises:

step 11, taking a location of a first color block tag as a coordinate origin of a coordinate system when information of the first color block tag is obtained by a mobile electronic device which is moving along a certain trajectory for a first time, and recording the information of the first color block tag and coordinate values thereof;

step 12, moving the mobile electronic device with the coordinate origin as a starting point to traverse all over the area to be localized;

step 13, calculating and recording coordinate values of a location of an obstacle based on a moving direction and a moving distance of the mobile electronic device relative to the starting point when the mobile electronic device detects the obstacle each time during the traversal;

step 14, constructing a map according to recorded information of the color block tag and coordinate values thereof and the coordinate values of the location of each said obstacle when the traversal has been finished.

In step 11, after color block tag is arranged in at least one specific position/any position of the area to be localized and mapped, it is necessary to have the mobile electronic traversing the entire area to obtain the relevant information in the area, thus realizing localization and mapping for the entire area. At the beginning of the first traversal, the mobile electronic device can be enabled to move along a certain trajectory until the mobile electronic device senses the information of the first color block tag, then the mobile electronic device takes the location of the first color block tag as the coordinate origin of a coordinate system composed of X-axis and Y-axis, and records the information of the first color block tag and coordinate values thereof (coordinate origin).

As can be understood, the location of the first color block tag when the information of the first color block tag is obtained is taken as the coordinate origin of the coordinate system composed of the X axis and the Y axis in order to facilitate calculation and composition. However, the location of the first color block tag is not limited as the coordinate origin of the coordinate system composed of the X-axis and the Y-axis, and may be marked as other reference points, so as to have a reference function to facilitate recording information of other points.

Wherein according the present embodiment at least on color block tag is correspondingly arranged at a specific position of the area to be localized, and the information of each said color block tag comprises unique coding information used for distinguishing an absolute position thereof, the unique coding information is represented by a plurality of different colors, different shapes, combination of different shapes and different colors or color blocks with different gray scales. Referring to FIG. 11a~FIG. 11c, different color block tags are distinguished by different colors (the shape may be the same) in FIG. 11a, for example, the red represents color block tag 1, the yellow represents color block tag 2, and the blue represents color block tag 3 . . . ; different color block tags are distinguished by different shapes (colors may be the same) in FIG. 11b, for example, the circle represents color block tag 1, the triangle represents color block tag 2, the square represents color block tag 3 . . . ; in FIG. 11c, different color labels are distinguished by combinations of different shapes and different colors, for example, the circle plus the red represents color block tag 1, the triangle plus the yellow represents color block tag 2, the blue plus the square represents color block tag 3 . . . .

As can be understood that the above provides only easy-to-understand description of the color block tag, which is not limited thereto. For example, each said color block tag may be composed of a plurality of small color blocks, each of which may be represented by a plurality of different colors, different shapes, combinations of different shapes and different colors or color blocks with different gray scales. Each said color block tag can be represented by color block plus two-dimensional code. Therefore, there exit a variety of ways of the composition of the color block tag, specifically, which way is more convenient is determined by the number of the color block tags needed in the environment of the area to be localized. In the present embodiment, the mobile electronic device can read the information of the color block tags by a color sensor/camera.

How the mobile electronic device determine the specific location of the color block tag when reading the information of the color block tag through the color sensor/camera will be described in detail as below.

Approach 1: during the mobile electronic device's moving process, when the mobile electronic device has sensed (reach a certain reading range) tag information of any one of the color block tags by using a color sensor, the mobile electronic device is enabled to move in a direction in which strength of the tag information of the color block tag is gradually increasing until the strength of the tag information of the color block tag sensed by the mobile electronic device is equal to or greater than a preset maximum value or the mobile electronic device collides with the color block tag, and then taking a current location of the mobile electronic device as the location of the color block tag. As can be understood, since that the tag information sensed by color sensor during the mobile electronic device's moving process is from not less than one color block tag, the mobile electronic device is enabled to move in a direction of a color block tag with the most strong tag information.

Approach 2: when a camera is used to read the tag information of the color block tags, the location of the color block tag relative to the mobile electronic device is determined based on number of pixels obtained by projecting a pattern of the color block tag onto CCD, thereby calculating the coordinate values of the color block tag;

Approach 3: when a camera is used to read the tag information of the color block tags, the mobile electronic device is enabled to move in a direction in which a pixel value obtained by projecting a pattern of the color block tag onto CCD is gradually increasing until the pixel value obtained by projecting the pattern of the color block tag onto the CCD reach a certain threshold or the mobile electronic device collides with the color block tag, and then a current location of the mobile electronic device is taken as the location of the color block tag.

As can be understood, in addition to the three approaches above, the location of the color block tag can be determined in other approaches by the mobile electronic device when the information of the color block tag is read through the color sensor/camera, which is not limited to the disclosed approaches.

In steps 12~13, the mobile electronic device is moved to traverse the entire area to be localized with the coordinate origin the starting point when it is determined that the location of the first color block tag is taken as the coordinate origin. Furthermore, when the mobile electronic device starts to move from the starting point, the real-time calculation of the moving direction and the moving distance of the mobile electronic device relative to the starting point is started up (for example, the moving path and relative position and angle of the robot can be recorded in real time through an encoder installed on a driving wheel axle of the robot, so that the location (including the distance and the direction) of the mobile electronic device relative to the starting point can be obtained through calculation). When the mobile electronic device detects the obstacle each time during the traversal, the coordinate values of the location of the obstacle can be calculated in the following approaches:

Approach 1: The obstacle is sensed by using a collision sensor, and a current coordinate values of the mobile electronic device is taken as the coordinate values of the location of the obstacle when the collision sensor senses a collision with the obstacle.

Approach 2: the obstacle is detected by using a laser sensor/an infrared sensor, and the location of the obstacle relative to the current location of the mobile electronic device is calculated on the basis of a calculation principle of laser/infrared distance when the laser sensor/infrared sensor detects the obstacle, thus the coordinate values of the location of the obstacle is calculated.

Moreover, an additional collision strategy is set in the present embodiment, that is, when the mobile electronic device has collided with an obstacle during the traversal, the mobile electronic device is made continue to advance to avoid the obstacle according to the preset collision strategy.

According to a preferable embodiment of the present invention, the preset collision strategy comprises: when the mobile electronic device senses a collision with the obstacle through, for example, a collision sensor, the mobile electronic device will perform an intelligent analysis to determine the modes of further movement. For example, the mobile electronic device may choose to retreat by greater than 0 and less than 20 cm and rotate to the right or left by 1-10 degrees according to a specific environmental pattern of the area to be localized. When the mobile electronic device is in a confined space, the mobile electronic device may choose to retreat by greater than 0 and less than 2 cm. Furthermore, the mobile electronic device chooses a larger angle of rotation, for example, the rotation angle of 2 degrees or even 10 degrees, when collision points of consecutive rotations for 3 times by 1 degree are in a plane.

As can be understood, in addition to the preset collision strategy disclosed herein, the collision strategy according to the present embodiment can also adopt other approaches, which is not limited thereto.

Therefore, according the preset collision strategy, the mobile electronic device is moved continually to obtain the coordinate values of other color block tag and obstacles, and the traversal for one time is accomplished until the entire area to be localized has been traversed. As can be understood, all feature information (including the location information of the location of the color block tag and the location of each obstacle) of the area to be localized is recorded after the mobile electronic device has accomplished the traversal for one time.

In step 14, a map is constructed on the basis of the recorded information of the color block tags and the coordinate values thereof and the coordinate values of the location of each obstacle after the mobile electronic device has accomplished the traversal for one time. The more recorded information, the richer and more detailed the constructed map will be. For example, when the mobile electronic device collides with an obstacle, the coordinate values of the obstacle are recorded, so that when the mobile electronic device which is placed in the indoor environment has traversed the entire room, the coordinate values of all the obstacles can be recorded continuously, and the obstacles which surrounds as periphery and at the same time makes a circle can be considered as a wall, so that a barrier-free region area, an obstacle area and a wall area of the room can be separated to construct the map of the whole room.

As can be understood, the constructed map is 2D map, and the mobile electronic device (for example, a robot) may navigate according to the constructed map.

According to a preferable embodiment of the present invention, to further improve the accuracy of the constructed map, the moving direction and the moving distance of the mobile electronic device relative to the starting point can be corrected based on an angular velocity and/or an angle and an acceleration of the mobile electronic device; so that each obtained coordinate value is corrected. For example, if the moving direction and the moving distance of the robot relative to the starting point are recorded in real time by an encoder installed on a driving wheel axle of the robot, there exit cumulative errors in the calculation process of the encoder due to skidding, uncertain distance of contact points between two driving wheels and ground or the like. Therefore, according to the present embodiment the mobile electronic device records the angular velocity and/or the angle and the acceleration of the mobile electronic device in real time, for example, preferably by using a gyro sensor and/or an electronic compass and an accelerometer, respectively, then the moving direction and moving distance of the mobile electronic device relative to the starting point recorded by the encoder in real time is corrected based on the angular velocity and/or angle and acceleration recorded by the gyro sensor and/or the electronic compass and the accelerometer in real time, so that each coordinate value calculated based on the corrected moving direction and moving distance of the mobile electronic device relative to the starting point and is made more accurate, so that the map based on the coordinate values is made more accurate.

It can be seen that the method for localization and mapping based on requires only one or more color block tags to realize the localization and mapping for the area to be localized, and the method is simple and possesses the technical effects of low cost, simple and effective operation.

Referring to FIG. 2, it is a flowchart of a method for localization and mapping based on color block according to the second embodiment of the present invention. The method is applicable for real-time mapping of an area to be localized in which two or more color block tags are arranged by utilizing a mobile electronic device. Wherein each said color block tag is correspondingly arranged at a specific position of the area to be localized, and information of each said color block tag comprises unique coding information used for distinguishing an absolute position thereof, the unique coding information is represented by a plurality of different colors, different shapes, combination of different shapes and different colors or color blocks with different gray scales. The mobile electronic device can be, for example, a robot.

The method for localization and mapping based on color block tags according to the present embodiment comprises:

step 21, taking a location of a first color block tag as a coordinate origin of a coordinate system when information of the first color block tag is obtained by a mobile electronic device which is moving along a certain trajectory for a first time, and recording the information of the first color block tag and coordinate values thereof;

step 22, moving the mobile electronic device with the coordinate origin as a starting point to traverse all over the area to be localized;

step 23, calculating and recording coordinate values of a location of an obstacle based on a moving direction and a moving distance of the mobile electronic device relative to the starting point when the mobile electronic device detects the obstacle each time during the traversal;

step 24, calculating coordinate values of location of other color block tag except the first color block tag each time when the mobile electronic device obtains information of the other color block tag based on the moving direction and the moving distance of the mobile electronic device relative to the starting point during the traversal;

step 25, constructing a map according to recorded information of the color block tags and coordinate values thereof and the coordinate values of the location of each said obstacle when the traversal has been finished.

As can be understood, steps 21~23 and step 25 in the present embodiment are basically consistent with steps 11~13 and 14 as shown in FIG. 1, which will not be repeated thereto.

Different from the first embodiment, since the method of the present embodiment is applicable to localize the area to be localized with two or more color block tags, and each said color block tag is arranged at a specific position of the area to be localized, and the information of each said color block tag comprises unique coding information used for distinguishing the absolute position, therefore, during the mobile electronic device's traversal, in addition to calculating and recording the coordinate values of the location of the obstacle each time when an obstacle is detected by the mobile electronic device, the coordinate values of the locations of the other color block tag except the first color block tag obtained by the mobile electronic device each time are calculated as well, that is, step 24.

How the mobile electronic device determines the specific locations of the other color block tag when the information of the other color block tag is read through the color block tag information reader is referred to the related description of the first embodiment, which will not be repeated thereto.

As can be understood, the information of the color block tag obtained by the mobile electronic device referred to herein mainly contains unique encoding information for distinguishing absolute position thereof. For example, when at least two color block tags are placed at different specific positions (for example, room 1, room 2, . . . ) of the area to be localized, it is necessary to determine and distinguish the specific location (absolute location) where the color block tag is located by the unique encoding information in the information of the color block tag, for example, the color block tag is located in room 1 or room 2 or the like. Therefore, the absolute position where the color block tag is located can be identified and then determined by obtaining the unique encoding information from the information of each said color block tag.

The representations of the unique encoding information of the color block tags can be referred to FIG. 11 and the related description of the first embodiment as described above.

Figure 13:
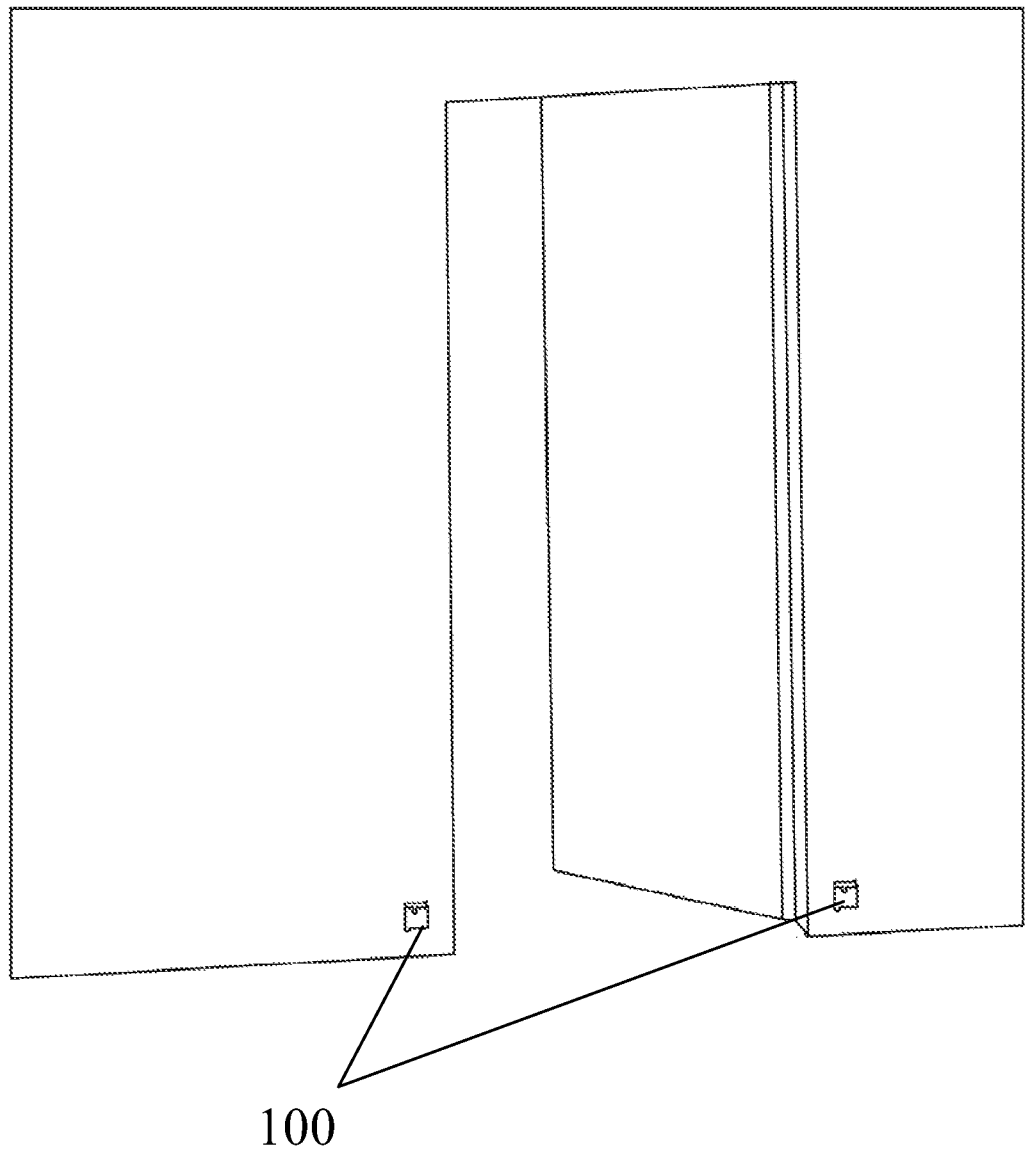
FIG. 13 and FIG. 14 show structural schematic diagrams of placing a color block tag in a fixing groove fixed on the wall.
Figure 14:
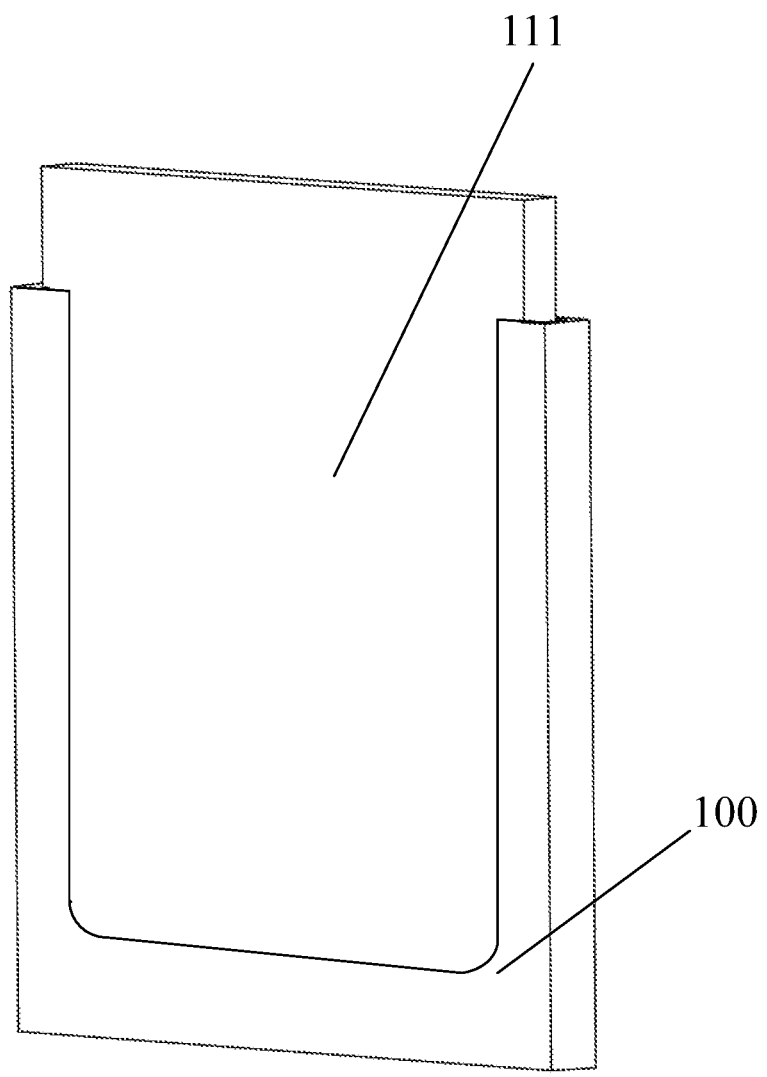

As can be understood, the method for localization and mapping based on color block tags according to the present embodiment is applicable for real-time mapping for the indoor area to be localized. When the indoor environment is positioned, it is preferable to place one color block tag 111 on a wall on left and/or right side of door frame in each room; as can be understood that the color block tag 111 can be fixed on the wall through magnet or the like. Preferably a fixing groove 100 is arranged on the wall on the left side and/or the right side of the door frame, and the color block tag 111 is set in the fixing groove 100, for the benefit of easy replacing, as shown in FIG. 13~FIG. 14.

In this way, the mobile electronic device can realize navigating and identifying of the absolute position based on the unique encoding information in the information of each said color block tag after the map construction is accomplished based on the recorded information of each said color block tag and the coordinate values thereof and the coordinate values of the location of each obstacle. For example, when the robot is required to traverse the room 2 for one time, the absolute position of the room 2 (namely, the location of the color block tag) can be determined based on the unique encoding information of the color block tag placed on the left and/or right side wall of the door frame in the room 2 and the mobile electronic device navigates to arrive in the room 2 based on the relative coordinate values (both direction and distance relative to the coordinates origin) of the location of the color block tag on the constructed map.

In addition, the mobile device (the robot) is enabled to know where it is located based on the unique encoding information in the information of each said color block tag. For example, a cleaning robot, which is required to clean a plurality of rooms, can determine which room it is located in by identifying the unique coding information in the information of the corresponding color block tag of each room, so as to avoid multiple cleanings for the same room and reduce repeated work. The main purpose of distinguishing the rooms is for cleaning one room after one room, so the efficiency will be higher. In this way, the robot traversal will cover a lot less repetitive routes.

Figure 3:
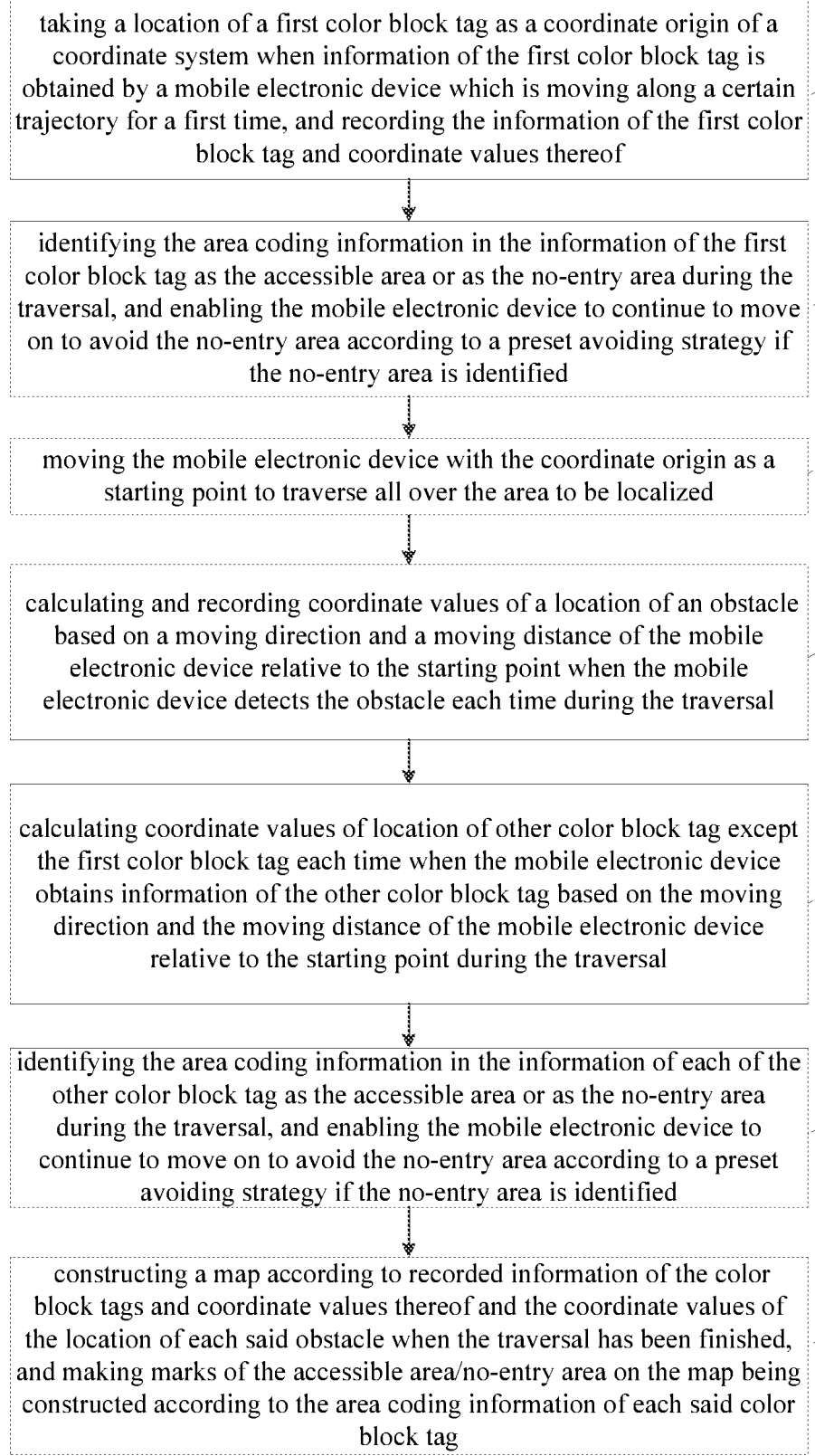
FIG. 3 is a flowchart of a method for localization and mapping based on color block tags according to the third embodiment of the present invention.

Referring to FIG. 3, it is a flowchart of a method for localization and mapping based on color block tags according to the third embodiment of the present invention. The method is applicable for real-time mapping of an area to be localized in which two or more color block tags are arranged by utilizing a mobile electronic device. Wherein each said color block tag is correspondingly arranged at a specific position of the area to be localized, and each said color block tag information comprises unique coding information used for distinguishing an absolute position thereof and area coding information used for distinguishing the an accessible area/a forbidding area, and a color block tag with the area coding information of the forbidding area limits a specific area behind a boundary where the color block tag is localized as the forbidding area. the unique coding information is represented by a plurality of different colors, different shapes, combination of different shapes and different colors or color blocks with different gray scales; the area coding information can represent the accessible area by a same color/a same shape/combination of a same shape and a same color, the area coding information can represent the no-entry area by another color block/another shape/combination of another shape and another color. The mobile electronic device can be, for example, a robot.

The method for localization and mapping based on color block tags according to the present embodiment comprises:

step 31, taking a location of a first color block tag as a coordinate origin of a coordinate system when information of the first color block tag is obtained by a mobile electronic device which is moving along a certain trajectory for a first time, and recording the information of the first color block tag and coordinate values thereof;

step 32, identifying the area coding information in the information of the first color block tag as the accessible area or as the no-entry area during the traversal, and enabling the mobile electronic device to continue to move on to avoid the no-entry area according to a preset avoiding strategy if the no-entry area is identified;

step 33, moving the mobile electronic device with the coordinate origin as a starting point to traverse all over the area to be localized;

step 34, calculating and recording coordinate values of a location of an obstacle based on a moving direction and a moving distance of the mobile electronic device relative to the starting point when the mobile electronic device detects the obstacle each time during the traversal;

step 35, calculating coordinate values of location of other color block tag except the first color block tag each time when the mobile electronic device obtains information of the other color block tag based on the moving direction and the moving distance of the mobile electronic device relative to the starting point during the traversal;

step 36, identifying the area coding information in the information of each of the other color block tag as the accessible area or as the no-entry area during the traversal, and enabling the mobile electronic device to continue to move on to avoid the no-entry area according to a preset avoiding strategy if the no-entry area is identified;

step 37, constructing a map according to recorded information of the color block tags and coordinate values thereof and the coordinate values of the location of each said obstacle when the traversal has been finished, and making marks of the accessible area/no-entry area on the map being constructed according to the area coding information of each said color block tag.

Figure 12:
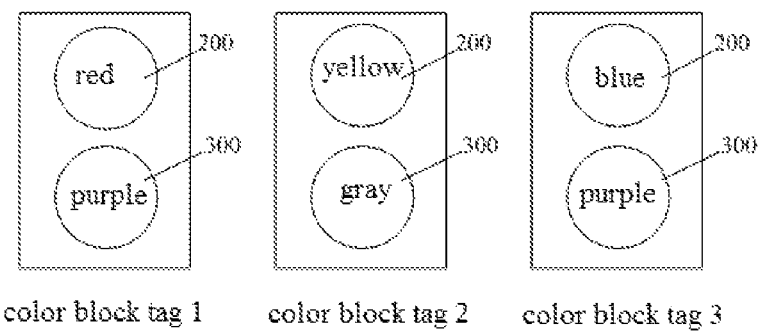
FIG. 12a, FIG. 12b and FIG. 12c show representations of three different color block tags, to act as unique coding information used for distinguishing the absolute position thereof and the area coding information used for distinguishing the accessible area/no-entry area.
Figure 12:
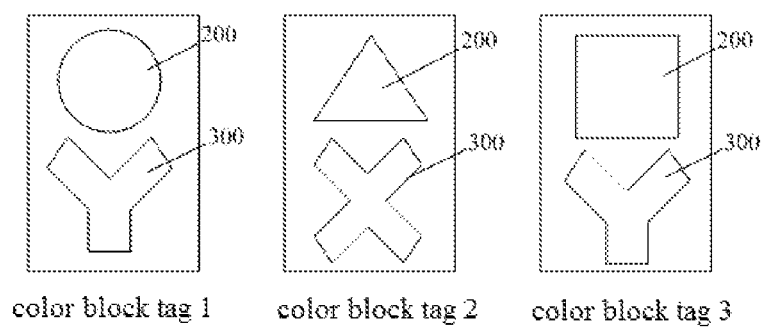
Figure 12:
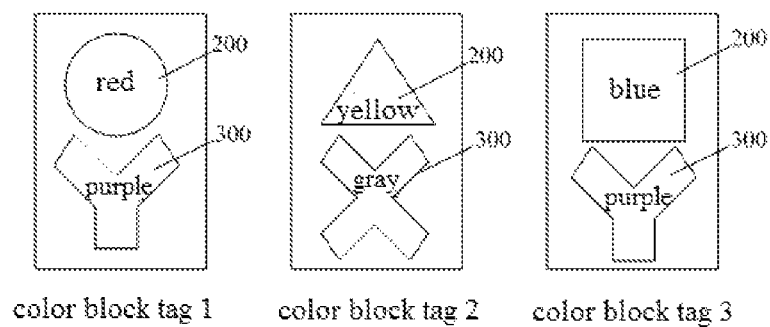

Each said color block tag comprises unique coding information and area coding information, the unique coding information is represented by a plurality of different colors, different shapes combination of different shapes and different colors or color blocks with different gray scales; the area coding information can represent the accessible area by the same color block/same shape/combination of the same shape and color, and represent the no-entry area by another color block/another shape/combination of another shape and color. Referring to FIG. 12a~FIG. 12c, each said color block tag comprises unique coding information 200 and area coding information 300. Different color block tags are distinguished by different colors representing unique coding information 200 (the shape may be the same) in FIG. 12a, for example, the red represents color block tag 1, the yellow represents color block tag 2, and the blue represents color block tag 3 . . . ; meanwhile the accessible area and the no-entry area are represented by two different colors, for example, the purple represents accessible area, the gray represents the no-entry area. different color block tags are distinguished by different shapes representing unique coding information 200 (colors may be the same) in FIG. 12b, for example, the circle represents color block tag 1, the triangle represents color block tag 2, the square represents color block tag 3 . . . ; meanwhile the accessible area and the no-entry area are represented by two different shapes, for example, the Y-shaped represents accessible area, the X-shaped represents the no-entry area. different color block tags are distinguished by combinations of different shapes and different colors representing unique coding information 200 in FIG. 12c, for example, the circle plus the red represents color block tag 1, the triangle plus the yellow represents color block tag 2, the blue plus the square represents color block tag 3 . . . ; meanwhile the accessible area is represented by combination of the same color and shape, and the no-entry area is represented by combination of another color and shape, for example, the purple plus the Y-shaped represents accessible area, the gray plus the X-shaped represents the no-entry area.

As can be understood that the above provides only easy-to-understand description of the color block tag, which is not limited thereto. For example, each said color block tag may be composed of a plurality of small color blocks, each of which may be represented by a plurality of different colors or different shapes or combinations of different shapes and different colors or color blocks with different gray scales. Therefore, there exit a variety of ways of the composition of the color block tag. Specifically, which way is more convenient is determined by the number of the color block tags needed in the environment of the area to be localized.

It can be seen that the present embodiment adds a function on the basis of the embodiment 2, that is, solving the problem of the automatic identification of the no-entry area (also referred to as virtual wall). The traditional method to solve the problem of the robot identification of the no-entry area mainly adopts the following approaches:

One approach is that an infrared emitting device is set on a boundary of the expected no-entry area and robot will not cross the boundary if detecting the infrared rays, which is proposed by irobot Company. The disadvantage of the approach is that the infrared emission device needs to be installed with a battery, so as to cause some inconvenience for users, on the other hand, the device is placed near the boundary, so that the device may move and thus fail to function if the device is touched by domestic pets or the like.

Another approach is using magnetic stripe as a boundary proposed by Neato Company, which requires users to attach the magnetic stripe to the boundary of the no-entry area, which is identified by using Hall sensors. The disadvantage of the approach lies in that the magnetic stripe attached to ground affects the ground appearance. On the other hand, if users want to replace the no-entry area, it is not convenient to take off the magnetic stripe.

The area coding information used for distinguishing the accessible area/no-entry area is arranged in the information of each said color block tag according to the present embodiment, wherein the color block tag with the area coding information of the no-entry area limits the specific area behind the boundary where the color block tag is localized as the no-entry area. In this way, when the mobile device identifies the area coding information in the color block tag, it can be identified. The mobile electronic device is enabled to continue to move on to avoid the no-entry area according to the preset avoiding strategy if the no-entry area is identified. In addition, when the traversal has been finished, marks of the accessible area/no-entry area are made on the map being constructed on basis of the area coding information of each said color block tag, for the benefit of navigation.

As can be understood that the relation comparison table for different area coding information of the color block tag representing the accessible area/no-entry area can be set in advance in the mobile device, so that when the area coding information in the information of each said color block tag is acquired, the accessible area or no-entry area can be identified according the comparison table.

Wherein, the preset avoiding strategy in the present embodiment is preferably: making the mobile electronic device retreat by P cm and rotate to the left/right by Q° When the no-entry area is identified, wherein P is not less than the length of the boundary, 45≤Q≤90. Based on the preset avoiding strategy, it basically guarantees that the mobile electronic device can continue to advance to avoid the obstacle.

Furthermore, the boundary between the accessible area and no-entry area can be identified in the following manners: when the mobile device judges that the area coding information in the tag represents the no-entry area, the mobile device is moved to find obstacles (the wall) and barrier-free area on the left and right sides of the tag, and the extension line of the wall is the boundary between the accessible area and no-entry area.

As can be understood, in addition to the avoiding strategy disclosed herein, the avoiding strategy of the present embodiment can also adopt other approaches, which is not limited thereto.

When applying the method for indoor localization and mapping of the present embodiment, it is preferable to place one color block tag on a left and/or right side walls of door frame in the room. Specifically, a fixing groove may be set on the wall of the left side and/or the right side of the door frame in the room, and the color block tag is placed in the fixing groove, for the benefits of convenience to remove and paste.

It can be seen that, compared with the virtual wall technique according to the exiting technique, the embodiment of the present invention writes the area coding information used for distinguishing the accessible area and no-entry area in the information of each said color block tag (in the fixing groove of the room door frame for example), so that the mobile device can determine the area is accessible after obtaining and identifying the area coding information of the color block tag. Therefore, the cost is low, and the overall appearance will not be affected, and it is easy to replace tags according to the present embodiment.

Referring to FIG. 4, it is a flowchart of a method for localization and mapping based on color block tags according to the first embodiment of the present invention. The method is applicable for real-time mapping of an area to be localized in which two or more color block tags are arranged by utilizing a mobile electronic device. Wherein each said color block tag is correspondingly arranged at a specific position of the area to be localized, and information of each said color block tag comprises unique coding information used for distinguishing an absolute position thereof. The mobile electronic device can be, for example, a robot.

The method for localization and mapping based on color block tags according to the present embodiment comprises:

step 41, taking a location of a first color block tag as a coordinate origin of a coordinate system when information of the first color block tag is obtained by a mobile electronic device which is moving along a certain trajectory for a first time, and recording the information of the first color block tag and coordinate values thereof;

step 42, moving the mobile electronic device with the coordinate origin as a starting point to traverse all over the area to be localized;

step 43, calculating and recording coordinate values of a location of an obstacle based on a moving direction and a moving distance of the mobile electronic device relative to the starting point when the mobile electronic device detects the obstacle each time during the traversal;

step 44, calculating coordinate values of location of other color block tag except the first color block tag each time when the mobile electronic device obtains information of the other color block tag based on a moving direction and a moving distance of the mobile electronic device relative to the starting point during the traversal;

step 45, constructing a map according to recorded information of the color block tags and coordinate values thereof and the coordinate values of the location of each obstacle when the traversal has been finished;

step 46, enabling the mobile electronic device to traverse all over the area to be localized for multiple times with the coordinate origin as the starting point, and correcting the coordinate values of each said color block tag by using a correction algorithm based on the coordinate values of each said color block tag obtained from traversal for each time;

step 47, correcting constructed map based on corrected coordinate values.

It can be seen that on the basis of the second embodiment the present embodiment further corrects the location of the color block tags through the correction algorithm according to the coordinate values of the color block tags obtained from traversal for multiple times, that is, steps 46 to 47.

Specifically, due to cumulative errors of the encoder or for other reasons, the coordinates of the color block tag obtained by the traversal for one time are inevitably erroneous, resulting in an inaccurate map. Therefore, after the map has been constructed, the coordinate values of each said color block tag are obtained for multiply times in the way that the mobile device traverses for multiply times, and then the coordinate values of each said color block tag are corrected by the recursive algorithm. The more times the mobile device traverses for, the more accurate the calculated coordinate values of the color block tag will be, until the final errors will be reduced to negligible. Finally, the constructed map is corrected based on the corrected coordinate values.

Therefore, the present embodiment provides the technical scheme that the coordinate values of each said color block tag are obtained for multiply times from traversal for multiply times, and then the coordinate values of each said color block tag are corrected by a recursive algorithm and the constructed map is corrected based on the corrected coordinate values, which further eliminates the cumulative errors of the mobile device, thereby improving the accuracy of the constructed map.

As can be understood that steps of traversing for multiply times to correct the coordinate values of each said color block tag may be added in the third embodiment, that is, steps 46 to 47.

Figure 5:
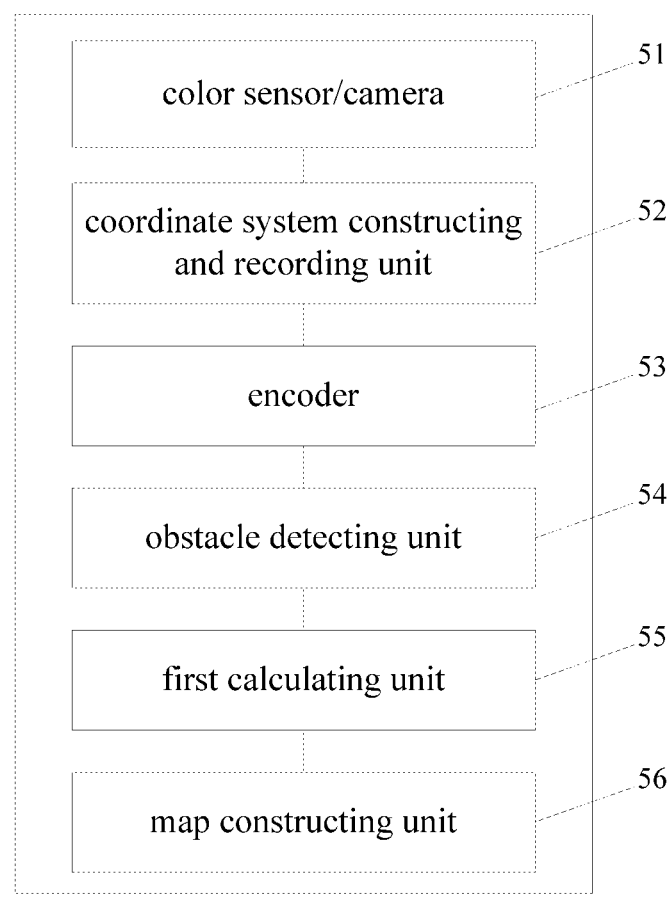
FIG. 5 is a composition block diagram of an apparatus for localization and mapping based on color block tags according to the fifth embodiment of the present invention.

Referring to FIG. 5, it is a composition block diagram of an apparatus for localization and mapping based on color block tags according to the fifth embodiment of the present invention. The apparatus for localization and mapping based on color block tag is mobile electronic device or installed in a mobile electronic device, which is applicable for real-time mapping of an area to be localized in which at least one color block tag is arranged, the mobile electronic device can be, for example, a robot. The mobile electronic device comprises:

a color sensor/camera 51, configured to read information of the color block tag;

a coordinate system constructing and recording unit 52, configured to take a location of a first color block tag as a coordinate origin of a coordinate system when information of the first color block tag is obtained by the color sensor/camera 51 in the mobile electronic device which is moving along a certain trajectory for a first time, and record information of the first color block tag and coordinate values thereof;

an encoder 53, configured to record a moving distance and a moving direction of the mobile electronic device relative to a starting point in real time when the mobile electronic device traverses all over the area to be localized with the coordinate origin as the starting point;

an obstacle detecting unit 54, configured to detect obstacle;

a first calculating unit 55, configured to calculate coordinate values of the location of each said obstacle based on the moving direction and the moving distance of the mobile electronic device relative to the starting point recorded by the encoder 53 when the mobile electronic device detects the obstacle, and send the calculated coordinate values to the coordinate system constructing and recording unit 52;

a map constructing unit 56, configured to construct a map on the basis of the information of the color block tag and the coordinate values thereof and the coordinate values of the location of each said obstacle recorded by the coordinate system constructing and recording unit 52.

The operation principle and working process of the apparatus for localization and mapping based on color block tags according to the present embodiment can be referred to the first embodiment, which will not be repeated thereto.

Wherein the obstacle detecting unit 54 comprises a collision sensor/a laser sensor/an infrared sensor:

The obstacle is sensed by using a collision sensor, and a current coordinate values of the mobile electronic device is taken as the coordinate values of the location of the obstacle when the collision sensor senses a collision with the obstacle;

The collision sensor component is used to sense a collision event of the mobile electronic device with external environment. The collision sensor components include, but are not limited to, eccentric hammer sensors, ball-type crash sensors, roller-type expansion sensors, mercury-switched crash sensors, piezoresistive effect type crash sensors, piezoelectric effect type impact sensors, and microswitches and the like.

The obstacle is detected by using a laser sensor/infrared sensor, and the location of the obstacle relative to the current location of the mobile electronic device is calculated on the basis of a calculation principle of laser/infrared distance when the laser sensor/infrared sensor detects the obstacle, thus the coordinate values of the location of the obstacle is calculated.

According to the present embodiment, preferably, the mobile device further comprises: a collision strategy unit, configured to enable the mobile electronic device to continue to advance to avoid the obstacle when the mobile electronic device has collided with an obstacle during the traversal according to a preset collision strategy.

The operation principle and working process of the collision strategy unit can be referred to the first embodiment.

Figure 6:
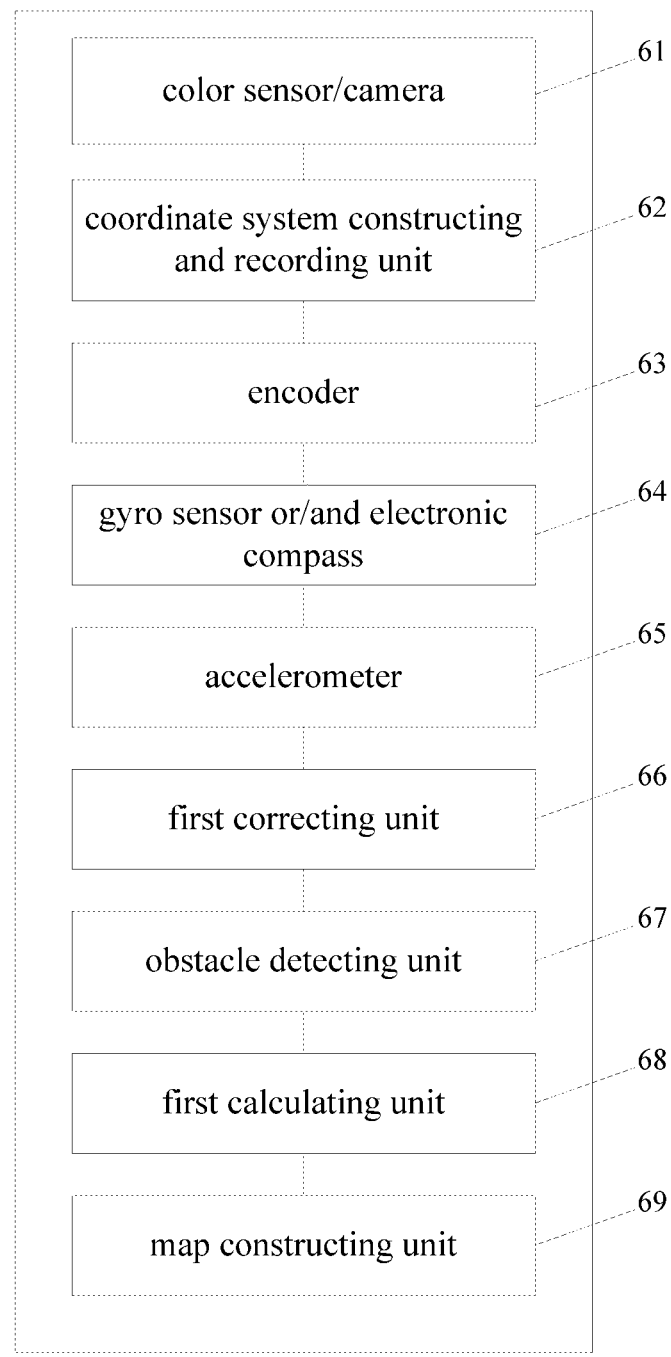
FIG. 6 is a composition block diagram of an apparatus for localization and mapping based on color block tags according to the sixth embodiment of the present invention.

According to another preferable embodiment of the present invention, referring to FIG. 6, the apparatus for localization and mapping based on color block tags is a mobile electronic device or installed in a mobile electronic device according to the sixth embodiment, which is applicable for real-time mapping of an area to be localized in which at least one color block tag is arranged, the mobile electronic device can be, for example, a robot.

The mobile electronic device comprises:

a color sensor/camera 61, configured to read information of the color block tag;

a coordinate system constructing and recording unit 62, configured to take a location of a first color block tag as a coordinate origin of a coordinate system when information of the first color block tag is obtained by the color sensor/camera 61 in the mobile electronic device which is moving along a certain trajectory for a first time, and record the information of the first color block tag and coordinate values thereof;

an encoder 63, configured to record a moving distance and a moving direction of the mobile electronic device relative to a starting point in real time when the mobile electronic device traverses all over the area to be localized with the coordinate origin as the starting point;

a gyro sensor or/and an electronic compass 64, configured to record an angular velocity or/and an angle of the mobile electronic device in real time;

an accelerometer 65, configured to record an acceleration of the mobile electronic device in real time;

a first correcting unit 66, configured to correct each said moving direction and each said moving distance of the mobile electronic device relative to the starting point based on the angular velocity or/and the angle and the acceleration of the mobile electronic device;

an obstacle detecting unit 67, configured to detect obstacle;

a first calculating unit 68, configured to calculate coordinate values of location of each said obstacle based on corrected moving direction and corrected moving distance of the mobile electronic device relative to the starting point when the mobile electronic device detects the obstacle, and send the calculated coordinate values to the coordinate system constructing and recording unit 62;

a map constructing unit 69, configured to construct a map according to information of the color block tags and coordinate values thereof and the coordinate values of the location of each said obstacle recorded by the coordinate system constructing and recording unit 62.

It can be seen that on the basis of the fifth embodiment, the present embodiment adds the gyro sensor or/and the electronic compass and the accelerometer, which are configured to record the angular velocity or/and the angle and the acceleration of the mobile electronic device in real time respectively so as to correct the moving direction and the moving distance of the mobile electronic device relative to the starting point, and calculate the coordinate values of the location of the obtained obstacle based on the corrected moving direction and the moving distance, thereby correcting each obtained coordinate value. Wherein, the gyro include, but are not limited to, wire gyro, electrostatic gyro, laser gyro, fiber optic gyro, micromechanical gyros or the like.

Therefore, the present embodiment can eliminate exiting cumulative errors from the calculation process of the encoder 63 due to skidding, uncertain distance of contact points between two driving wheels and ground according to the driving wheel with the encoder 63 installed, or the like. So that each obtained coordinate value calculated on the basis of the corrected moving direction and the moving distance of the mobile electronic device relative to the starting point is more accurate and the map constructed according to the coordinate value is made more accurate.

Figure 7:
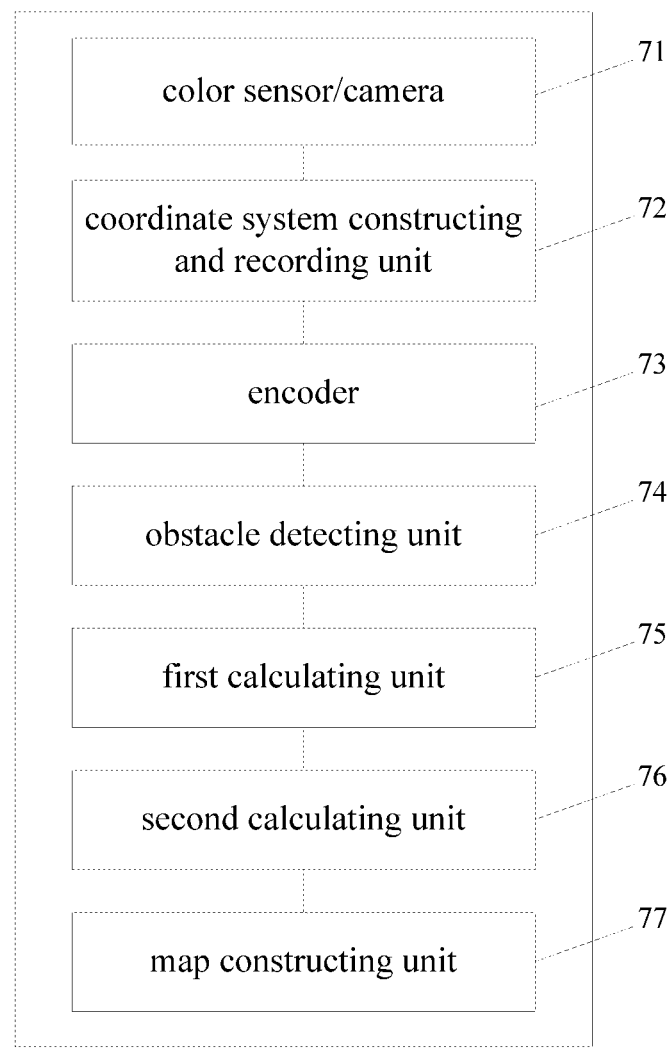
FIG. 7 is a composition block diagram of an apparatus for localization and mapping based on color block tags according to the seventh embodiment of the present invention.

Referring to FIG. 7, it is a composition block diagram of an apparatus for localization and mapping based on color block tags according to the seventh embodiment of the present invention. The apparatus is mobile electronic device or installed in a mobile electronic device, which is applicable for real-time mapping of an area to be localized in which two or more color block tags are arranged. Wherein each said color block tag is correspondingly arranged at a specific position of the area to be localized, and each said color block tag information comprises unique coding information used for distinguishing the absolute position thereof. The mobile electronic device can be, for example, a robot.

The apparatus for localization and mapping based on color block tags comprises:

a color sensor/camera 71, configured to read information of the color block tags;

a coordinate system constructing and recording unit 72, configured to take a location of a first color block tag as a coordinate origin of a coordinate system when information of the first color block tag is obtained by the color sensor/camera 71 in the mobile electronic device which is moving along a certain trajectory for a first time, and record information of the first color block tag and coordinate values thereof;

an encoder 73, configured to record a moving distance and a moving direction of the mobile electronic device relative to a starting point in real time when the mobile electronic device traverses all over the area to be localized with the coordinate origin as the starting point;

an obstacle detecting unit 74, configured to detect obstacle;

a first calculating unit 75, configured to calculate coordinate values of a location of each said obstacle based on a moving direction and a moving distance of the mobile electronic device relative to the starting point recorded by the encoder 73 when the mobile electronic device detects the obstacle, and send the calculated coordinate values to the coordinate system constructing and recording unit 72;

a second calculating unit 76, configured to calculate coordinate values of location of other color block tag except the first color block tag each time when the mobile electronic device obtains information of the other color block tag based on the moving direction and the moving distance of the mobile electronic device relative to the starting point recorded by the encoder 73, and send information of the other color block tag and the corresponding coordinate values to the coordinate system constructing and recording unit 72;

a map constructing unit 77, configured to construct a map according to information of the color block tags and coordinate values thereof and the coordinate values of the location of each said obstacle recorded by the coordinate system constructing and recording unit 72.

The operation principle and working process of the apparatus for localization and mapping based on color block tags according to the present embodiment can be referred to the second embodiment, which will not be repeated thereto.

As can be understood that the apparatus for localization and mapping based on color block tags according to the present embodiment can further comprise the gyro sensor or/and electronic compass 64, the accelerometer 65 and the first correcting unit 66 according to the sixth embodiment, so as to correct the moving direction and the moving distance of the mobile electronic device relative to the starting point based on the angular velocity or/and the angle and the acceleration of the mobile electronic device recorded in real time by the gyro sensor or/and electronic compass and the accelerometer respectively, and calculate the coordinate values of the location of the obtained obstacle based on the corrected moving direction and the moving distance, thereby correcting each obtained coordinate value.

Figure 8:
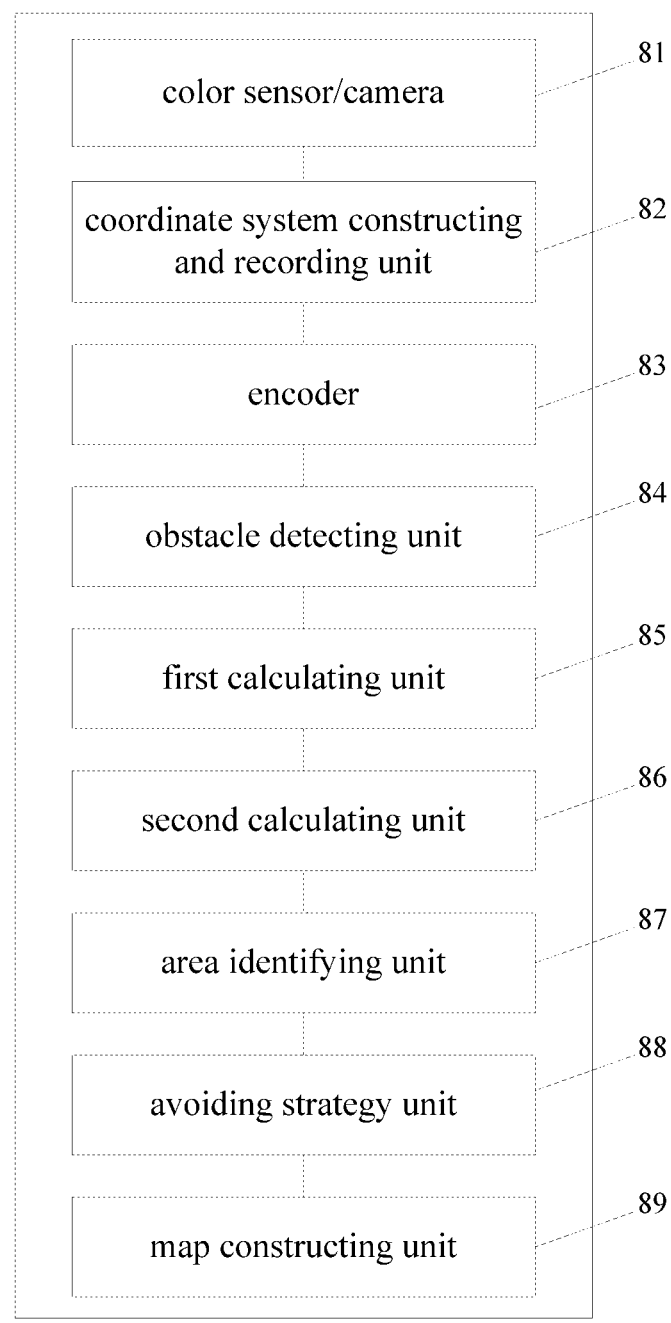
FIG. 8 is a composition block diagram of an apparatus for localization and mapping based on color block tags according to the eighth embodiment of the present invention.

Referring to FIG. 8, it is a composition block diagram of an apparatus for localization and mapping based on color block tags according to the eighth embodiment of the present invention. The apparatus is mobile electronic device or installed in a mobile electronic device, which is applicable for real-time mapping of an area to be localized in which two or more color block tags are arranged. Wherein each said color block tag is correspondingly arranged at a specific position of the area to be localized, and the information of each said color block tag comprises unique coding information used for distinguishing an absolute position thereof and area coding information used for distinguishing an accessible area/a no-entry area. Wherein a color block tag with the area coding information of the no-entry area limits a specific area behind a boundary where the color block tag is localized as the no-entry area. The mobile electronic device can be, for example, a robot.

The mobile electronic device comprises:
- a color sensor/camera 81, configured to read information of the color block tag;
- a coordinate system constructing and recording unit 82, configured to take a location of a first color block tag as a coordinate origin of a coordinate system when information of the first color block tag is obtained by the color sensor/camera 81 in the mobile electronic device which is moving along a certain trajectory for a first time, and record the information of the first color block tag and coordinate values thereof;
- an encoder 83, configured to record a moving distance and a moving direction of the mobile electronic device relative to a starting point in real time when the mobile electronic device traverses all over the area to be localized with the coordinate origin as the starting point;
- an obstacle detecting unit 84, configured to detect obstacle;
- a first calculating unit 85, configured to calculate coordinate values of a location of each obstacle based on a moving direction and a moving distance of the mobile electronic device relative to the starting point recorded by the encoder 83 when the mobile electronic device detects the obstacle, and send the calculated coordinate values to the coordinate system constructing and recording unit 82;
- a second calculating unit 86, configured to calculate coordinate values of locations of other color block tag except the first color block tag each time when the mobile electronic device obtains information of the other color block tag based on the moving direction and the moving distance of the mobile electronic device relative to the starting point recorded by the encoder 83, and send information of the other color block tag and the corresponding coordinate values to the coordinate system constructing and recording unit 82;
- an area identifying unit 87, configured to identify the area coding information in information of the color block tag as the accessible area or as the no-entry area when the color sensor/the camera 81 obtains information of each said color block tag; as can be understood that the relation comparison table for different area coding information of the color block tag representing the accessible area/no-entry area can be set in advance in the area identifying unit 87, so that when the area coding information in the information of each of the other color block tag is acquired, the accessible area or no-entry area can be identified according the comparison table;
- an avoiding strategy unit 88, configured to enable the mobile electronic device to continue to move on to avoid the no-entry area according to a preset avoiding strategy if the area coding information is identified as the no-entry area by the area identifying unit 87;
- a map constructing unit 89, configured to construct a map according to information of the color block tags and coordinate values thereof and the coordinate values of the location of each obstacle recorded by the coordinate system constructing and recording unit 82, and make marks of the accessible area/no-entry area on the map being constructed according to the area coding information of each said color block tag.

The apparatus for localization and mapping based on color block tags according to the present embodiment solves the problem of the automatic identification of the no-entry area (also referred to as virtual wall), of which the operation principle and working process can be referred to the third embodiment.

As can be understood that the apparatus for localization and mapping based on color block tags according to the present embodiment can further comprises the gyro sensor or/and electronic compass 64, the accelerometer 65, and the first correcting unit 66 according to the sixth embodiment, so as to correct the moving direction and the moving distance of the mobile electronic device relative to the starting point based on the angular velocity or/and the angle and the acceleration of the mobile electronic device recorded in real time by the gyro sensor or/and electronic compass and the accelerometer respectively, and calculate the coordinate values based on the corrected moving direction and the moving distance, thereby correcting each obtained coordinate value.

Figure 9:
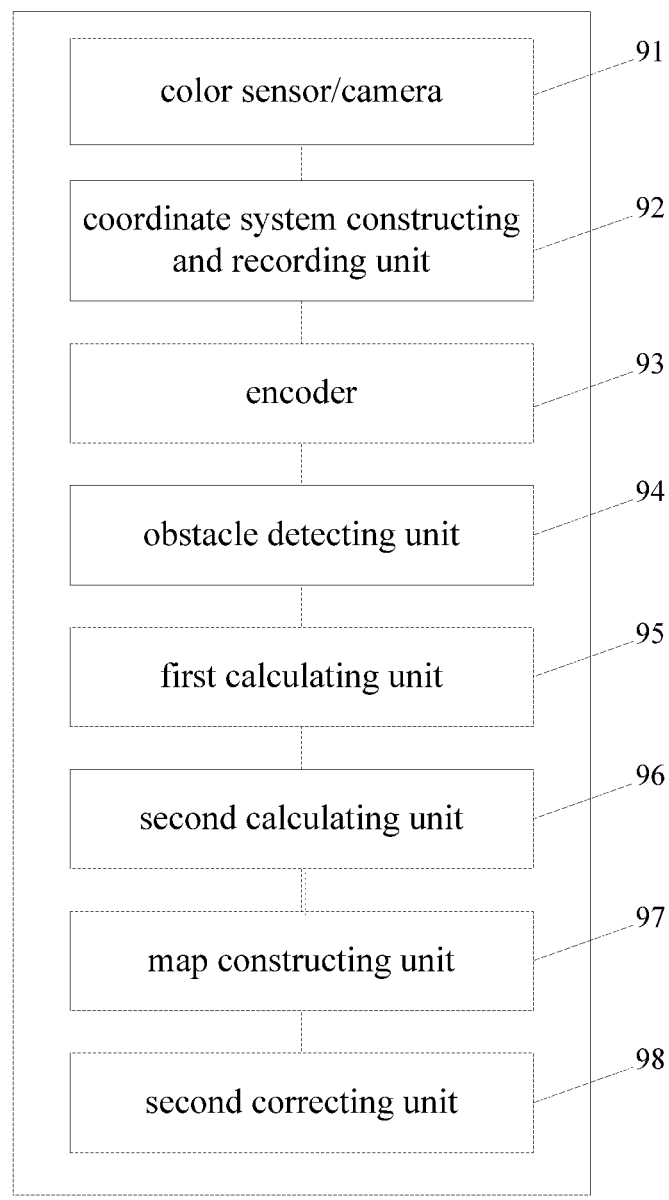
FIG. 9 is a composition block diagram of an apparatus for localization and mapping based on color block tags according to the ninth embodiment of the present invention.

Referring to FIG. 9, it is a composition block diagram of an apparatus for localization and mapping based on color block tags according to the ninth embodiment of the present invention. The apparatus is mobile electronic device or installed in a mobile electronic device, which is applicable for real-time mapping of an area to be localized in which two or more color block tags are arranged. Wherein each said color block tag is correspondingly arranged at a specific position of the area to be localized, and each said color block tag information comprises unique coding information used for distinguishing the absolute position thereof. The mobile electronic device can be, for example, a robot.

The mobile electronic device comprises:
- a color sensor/camera 91, configured to read information of the color block tags;
- a coordinate system constructing and recording unit 92, configured to take a location of a first color block tag as a coordinate origin of a coordinate system when information of the first color block tag is obtained by color sensor/camera 91 in the mobile electronic device which is moving along a certain trajectory for a first time, and record information of the first color block tag and coordinate values thereof;
- an encoder 93, configured to record a moving distance and a moving direction of the mobile electronic device relative to a starting point in real time when the mobile electronic device traverses all over the area to be localized with the coordinate origin as the starting point;
- an obstacle detecting unit 94, configured to detect obstacle;
- a first calculating unit 95, configured to calculate coordinate values of a location of each said obstacle based on a moving direction and a moving distance of the mobile electronic device relative to the starting point recorded by the encoder 93 when the mobile electronic device detects the obstacle, and send the calculated coordinate values to the coordinate system constructing and recording unit 92;
- a second calculating unit 96, configured to calculate coordinate values of location of other color block tag except the first color block tag each time when the mobile electronic device obtains information of the other color block tag based on the moving direction and the moving distance of the mobile electronic device relative to the starting point recorded by the encoder 93, and send information of the other color block tag and the corresponding coordinate values to the coordinate system constructing and recording unit 92;

a map constructing unit 97, configured to construct a map according to information of the color block tags and coordinate values thereof and the coordinate values of the location of each obstacle recorded by the coordinate system constructing and recording unit 92; and a second correcting unit 98, configured to correct the coordinate values of each said color block tag by using a correction algorithm after the mobile electronic device traverses all over the area to be localized for multiple times with the coordinate origin as the starting point according to the coordinate values of each said color block tag obtained from traversal for each time, and send corrected coordinate values to the map constructing unit 97 to correct constructed map.

The present embodiment adds the second correcting unit 98 on the basis of the seventh embodiment, according to which the coordinate values of each said color block tag are obtained for multiply times in the way that the mobile device traverses for multiply times, and then the coordinate values of each said color block tag are corrected by the recursive algorithm. The more times the mobile device traverse for, the more accurate the calculated coordinate values of the color block tag will be, until the final error will be reduced to negligible. Finally, the constructed map is corrected based on the corrected coordinate values by the map constructing unit 97. Thereby the exiting cumulative error from the mobile device traversing for one time is eliminated, and the accuracy of the constructed map is improved.

Figure 10:
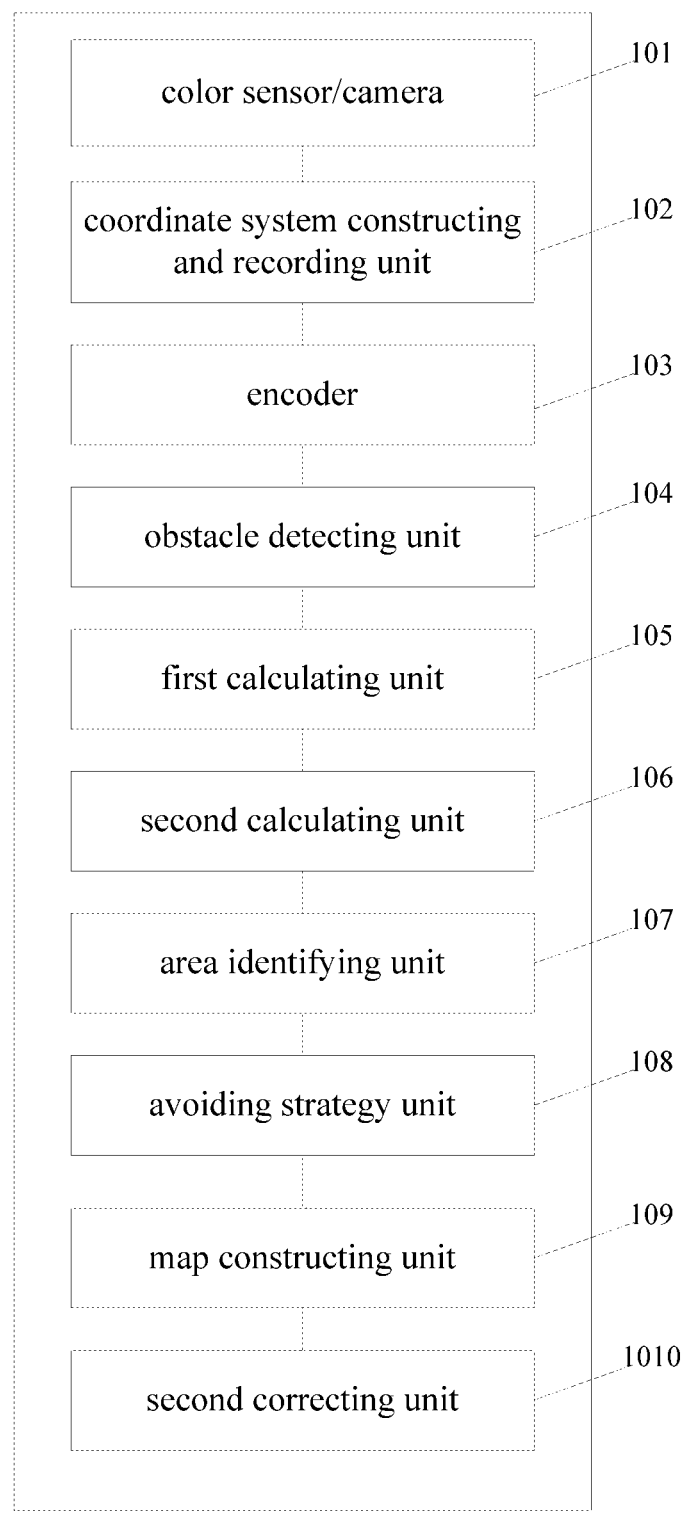
FIG. 10 is a composition block diagram of an apparatus for localization and mapping based on color block tags according to the tenth embodiment of the present invention.

Referring to FIG. 10, it is a composition block diagram of an apparatus for localization and mapping based on color block tags according to the tenth embodiment of the present invention. The apparatus is mobile electronic device or installed in a mobile electronic device, which is applicable for real-time mapping of an area to be localized in which two or more color block tags are arranged. Wherein each said color block tag is correspondingly arranged at a specific position of the area to be localized, and the information of each said color block tag comprises unique coding information used for distinguishing the absolute position thereof and area coding information used for distinguishing the an accessible area/a no-entry area, wherein a color block tag with the area coding information of the no-entry area limits the specific area behind the boundary where the color block tag is localized as the no-entry area. The mobile electronic device can be, for example, a robot.

The mobile electronic device comprises:

a color sensor/camera 101, configured to read information of the color block tags;

a coordinate system constructing and recording unit 102, configured to take a location of a first color block tag as a coordinate origin of a coordinate system when information of the first color block tag is obtained by color sensor/camera 101 in the mobile electronic device which is moving along a certain trajectory for a first time, and record information of the first color block tag and coordinate values thereof;

an encoder 103, configured to record a moving distance and a moving direction of the mobile electronic device relative to a starting point in real time when the mobile electronic device traverses all over the area to be localized with the coordinate origin as the starting point;

an obstacle detecting unit 104, configured to detect obstacle;

a first calculating unit 105, configured to calculate coordinate values of a location of each said obstacle based on a moving direction and a moving distance of the mobile electronic device relative to the starting point recorded by the encoder 103 when the mobile electronic device detects the obstacle, and send the calculated coordinate values to the coordinate system constructing and recording unit 102;

a second calculating unit 106, configured to calculate coordinate values of location of other color block tag except the first color block tag each time when the mobile electronic device obtains information of the other color block tag based on a moving direction and a moving distance of the mobile electronic device relative to the starting point recorded by the encoder 103, and send the information of the other color block tag and the corresponding coordinate values to the coordinate system constructing and recording unit 102;

an area identifying unit 107, configured to identify the area coding information in information of the color block tag as the accessible area or as the no-entry area when the color sensor/camera 101 obtains information of each said color block tag;

an avoiding strategy unit 108, configured to enable the mobile electronic device to continue to move on to avoid the no-entry area according to a preset avoiding strategy if the area coding information is identified as the no-entry area by the area identifying unit 107;

a map constructing unit 109, configured to construct a map on the basis of the information of the color block tags and coordinate values thereof and the coordinate values of the location of each said obstacle by the coordinate system constructing and recording unit 102, and make marks of the accessible area/no-entry area on the map being constructed on basis of the area coding information of each said color block tag;

a second correcting unit 1010, configured to correct the coordinate values of each said color block tag by using a correction algorithm after the mobile electronic device traverses all over the area to be localized for multiple times with the coordinate origin as the starting point according to the coordinate values of each said color block tag obtained from traversal for each time, and send corrected coordinate values to the map constructing unit 109 to correct constructed map.

The present embodiment adds the second correcting unit 1010 on the basis of the eighth embodiment, according to which the coordinate values of each said color block tag are obtained for multiply times in the way that the mobile device traverses for multiply times, and then the coordinate values of each said color block tag are corrected by the recursive algorithm. The more times the mobile device traverses for, the more accurate the calculated coordinate values of the color block tag will be, until the final error will be reduced to negligible. Finally, the constructed map is corrected based on the corrected coordinate values. Thereby exiting cumulative errors from the mobile device traversing for one time are eliminated, and the accuracy of the constructed map is improved.

The embodiment of the present invention further discloses an intelligent mobile device, which is comprising a mobile apparatus and the apparatus for localization and mapping based on color block tags as shown in FIG. 5~FIG. 10. The intelligent mobile device is preferably a robot.

It should be explained that according to the present description, the term "comprise", "include" or any other variant thereof which is intended to encompass the non-exclusive, so that the process, method, objects or apparatus comprising a series of elements includes not only those elements, but also includes other elements which are not explicitly listed, or further includes the elements that are inherent in such processes, methods, objects or devices. In the absence of more restrictions, the elements defined by the statements "comprise . . . " do not preclude the presence of additional identical elements in the process, methods, objects or devices that includes the listed elements.

Finally, it should be noted as well that the above-mentioned series of processing includes not only the processing performed according to time sequence in the order described herein, but also the processing performed in parallel or separately, rather than in chronological order. With the description of the above embodiments, it will be apparent to persons having ordinary skill in the art that the present invention may be implemented by means of software and necessary hardware platforms, and may be implemented only by software for sure. Based on this understanding, all or parts of the technical solution of the present invention that contributes to the background art may be embodied in the form of software product, which can be stored in a storage medium such as ROM/RAM, magnetic disk, optical disk and so on, which is including a number of instructions for enabling a computer device (which may be a personal computer, a server, or a network device and so on) to perform the methods described in certain parts of the embodiments or each embodiment of the present invention.

The foregoing descriptions are merely exemplary embodiments of the present invention, but are not intended to limit the present disclosure. Any modifications, equivalent substitutions, and improvements made by those skilled in the art within the spirit and principle of the present disclosure shall fall within the protection scope of the present disclosure.

What is claimed is:

1. A method for localization and mapping based on color block tags, wherein the method is applicable for real-time mapping of an area to be localized in which at least one color block tag is arranged, and the method comprises steps of:
    taking a location of a first color block tag as a coordinate origin of a coordinate system, wherein the location of the first color block tag is from information of the first color block tag obtained for a first time by a mobile electronic device when moving along a certain trajectory and recording the information of the first color block tag and coordinate values thereof;
    moving the mobile electronic device with the coordinate origin as a starting point to traverse all over the area to be localized, calculating and recording coordinate values of a location of an obstacle when the mobile electronic device detects an obstacle each time during a traversal, wherein the coordinate values of a location of an obstacle are obtained based on a moving direction and a moving distance of the mobile electronic device relative to the starting point;
    wherein the number of the color block tag is two or more, each said color block tag is correspondingly arranged at a specific position of the area to be localized, and the information of each said color block tag comprises unique coding information used for distinguishing an absolute position thereof, the unique coding information is represented by a plurality of different colors, different shapes, combination of different shapes and different colors or color blocks with different gray scales, and the method further comprises step of:
    calculating coordinate values of other color block tags except the first color block tag each time when the mobile electronic device obtains information of the other color block tags based on a moving direction and a moving distance of the mobile electronic device relative to the starting point during the traversal, and recording the information of the other color block tag and the corresponding coordinate values;
    wherein the information of each said color block tag further comprises area coding information used for recognizing an accessible area/a no-entry area, wherein a color block tag with the area coding information of the no-entry area limits a specific area behind a boundary where the color block tag is localized as the no-entry area, the area coding information can represent the accessible area by a same color/a same shape/combination of a same shape and a same color, the area coding information can represent the no-entry area by another color/another shape/combination of another shape and another color, and the method further comprises step of:
    identifying the area coding information in the information of the color block tag as the accessible area or as the no-entry area firstly when the mobile electronic device obtains the information of the color block tag, and then enabling the mobile electronic device to keep moving by avoiding the no-entry area according to a preset avoiding strategy if the no-entry area is identified;
    constructing a map according to recorded information of the color block tag and coordinate values thereof and the coordinate values of the location of each said obstacle when the traversal has been finished.

2. The method for localization and mapping based on color block tags according to claim 1, wherein after constructing the map, the method further comprises steps of:
    enabling the mobile electronic device to traverse all over the area to be localized for multiple times with the coordinate origin as the starting point, and correcting the coordinate values of each said color block tag by using a correction algorithm based on the coordinate values of each said color block tag obtained from traversal for each time; and
    correcting constructed map based on corrected coordinate values.

3. The method for localization and mapping based on color block tags according to claim 1, wherein after finishing the traversal, making marks of the accessible area/no-entry area on the map being constructed according to the area coding information of each color block tag during the map-constructing process based on the recorded information and the coordinate values of the color block tags and the coordinate values of the location of each obstacle.

4. The method for localization and mapping based on color block tags according to claim 1, wherein calculating the coordinate values of the location the obstacle when detected by the mobile electronic device each time in the following manners:
    sensing the obstacle by using a collision sensor, and taking coordinate values of the mobile electronic device as the coordinate values of the location of the obstacle when the collision sensor senses a collision with the obstacle; or detecting the obstacle by using a laser sensor/an infrared sensor, and calculating the location of the obstacle relative to a current location of the mobile electronic device according to a calculation principle of laser/infrared distance when the laser sensor/infrared sensor detects the obstacle, thus calculating the coordinate values of the location of the obstacle.

5. The method for localization and mapping based on color block tags according to claim 1, wherein the method further comprises step of:

correcting each said moving direction and each said moving distance of the mobile electronic device relative to the starting point based on an angular velocity or an angle, and an acceleration of the mobile electronic device, and obtaining coordinate values according to corrected moving direction and corrected moving distance of the mobile electronic device relative to the starting point.

6. The method for localization and mapping based on color block tags according to claim 1, wherein the location of each said color block tag is determined in the following manners:

when the mobile electronic device has sensed tag information of any one of the color block tags by using a color sensor, enabling the mobile electronic device to move in a direction in which strength of tag information of the color block tag is gradually increasing until the strength of the tag information of the color block tag sensed by the mobile electronic device is equal to or greater than a preset maximum value or the mobile electronic device collides with the color block tag, and then taking a current location of the mobile electronic device as the location of the color block tag.

7. The method for localization and mapping based on color block tags according to claim 1, wherein the location of each said color block tag is determined in the following manners:

when the mobile electronic device has sensed tag information of any one of the color block tags by using a camera, the location of the color block tag relative to the mobile electronic device is determined based on number of pixels obtained by projecting a pattern of the color block tag onto a charge coupled device (CCD), thereby calculating the coordinate values of the color block tag; or when the mobile electronic device read tag information of the color block tags by using a camera, enabling the mobile electronic device to move in a direction in which a pixel value obtained by projecting a pattern of a color block tag onto the charge coupled device (CCD) is gradually increasing until the pixel value obtained by projecting the pattern of the color block tag onto the charge coupled device (CCD) reaches a certain threshold or the mobile electronic device collides with the color block tag, and then taking a current location of the mobile electronic device as the location of the color block tag.

8. The method for localization and mapping based on color block tags according to claim 1, when the mobile electronic device has collided with an obstacle during the traversal, enabling the mobile electronic device to continue to advance to avoid the obstacle according to a preset collision strategy;

the preset collision strategy is preferably;

enabling the mobile electronic device to retreat by M cm and rotate to the left/right by N° when a collision occurs, wherein 0<M<20, 0<N<10;

the preset avoiding strategy comprises:

enabling the mobile electronic device to retreat by P cm and rotate to the left/right by Q° when the no-entry area is identified, wherein P is not less than the length of the boundary, $45 \leq Q \leq 90$.

9. The method for localization and mapping based on color block tags according to claim 1, wherein the method is applicable for real-time mapping for an indoor area to be localized; the color block tag is arranged on a left or right side wall of a door frame.

10. An apparatus for localization and mapping based on color block tags, wherein the apparatus is applicable for real-time mapping of an area to be localized in which at least one color block tag is arranged, the apparatus for localization and mapping is a mobile electronic device, and the mobile electronic device comprises:

a color sensor/camera, configured to read information of the color block tags; and a coordinate system constructing and recording unit, configured to take a location of a first color block tag as a coordinate origin of a coordinate system, wherein the location of the first color block tag is from information of the first color block tag obtained by the color sensor/camera in the mobile electronic device when moving along a certain trajectory for a first time and record the information of the first color block tag and coordinate values thereof;

an encoder, configured to record a moving distance and a moving direction of the mobile electronic device relative to a starting point in real time when the mobile electronic device traverses all over the area to be localized with the coordinate origin as the starting point;

an obstacle detecting unit, configured to detect obstacle;

a first calculating unit, configured to calculate coordinate values of the location of each said obstacle based on the moving direction and the moving distance of the mobile electronic device relative to the starting point recorded by the encoder when the mobile electronic device detects the obstacle, and send the calculated coordinate values to the coordinate system constructing and recording unit;

wherein the number of the color block tags is two or more, and each said color block tag is correspondingly arranged at a specific position of the area to be localized, and the information of each said color block tag comprises unique coding information used for distinguishing an absolute position thereof, the unique coding information is represented by a plurality of different colors, different shapes, combination of different shapes and different colors or color blocks with different gray scales, and the apparatus further comprises:

a second calculating unit, configured to calculate coordinate values of locations of other color block tags except the first color block tag each time when the mobile electronic device obtains information of other color block tags based on the moving direction and the moving distance of the mobile electronic device relative to the starting point during the traversal, and send the information of other color block tags and the corresponding coordinate values to the coordinate system constructing and recording unit;

wherein the information of each said color block tag further comprises area coding information used for recognizing an accessible area/a no-entry area, and wherein a color block tag with the area coding information of the no-entry area limits a specific area behind a boundary where the color block tag is localized as the no-entry area, the area coding information can represent the accessible area by a same color block/a same shape/combination of a same shape and a same color, the area coding information can represent the no-entry area by another color block/another shape/combination of another shape and another color, and the apparatus further comprises:
an area identifying unit, configured to identify the area coding information in information of the color block tag as the accessible area or as the no-entry area firstly when the mobile electronic device obtains the information of each said color block tag, and then enable the mobile electronic device to keep moving by avoiding the no-entry area according to a preset avoiding strategy if the no-entry area is identified;
a map constructing unit, configured to construct a map according to information of the color block tags and coordinate values thereof and the coordinate values of the location of each said obstacle recorded by the coordinate system constructing and recording unit.

11. The apparatus for localization and mapping based on color block tags according to claim 10, wherein the apparatus further comprises:
a second correcting unit, configured to correct the coordinate values of each said color block tag by using a correction algorithm after the mobile electronic device traverses all over the area to be localized for multiple times with the coordinate origin as the starting point according to the coordinate values of each said color block tag obtained from traversal for each time, and send corrected coordinate values to the map constructing unit to correct constructed map.

12. The apparatus for localization and mapping based on color block tags according to claim 10, wherein after finishing the traversal, making marks of the accessible area/no-entry area on the map being constructed according to the area coding information of each color block tag during the map-constructing process based on the recorded information and the coordinate values of the color block tags and the coordinate values of the location of each obstacle.

13. The apparatus for localization and mapping based on color block tags according to claim 10, wherein the obstacle detecting unit comprises a collision sensor, a laser sensor or an infrared sensor;
the first calculating unit takes calculated coordinate values of a current location of the mobile electronic device as the coordinate values of the location of the obstacle when the collision sensor senses a collision with the obstacle;
the laser sensor/the infrared sensor calculates the location of the obstacle relative to the current location of the mobile electronic device according to a calculation principle of laser/infrared distance when the laser sensor/the infrared sensor detects the obstacle, and sends the location of the obstacle relative to the current location of the mobile electronic device to the first calculating unit; the first calculating unit calculates the coordinate values of the location of the obstacle based on the calculated coordinate values of the current location of the mobile electronic device and the location of the obstacle relative to the current location of the mobile electronic device.

14. The apparatus for localization and mapping based on color block tags according to claim 10, wherein the apparatus further comprises:
a gyro sensor or an electronic compass and an accelerometer, configured to record an angular velocity or an angle and an acceleration of the mobile electronic device in real time respectively when the mobile electronic device traverses all over the area to be localized with the coordinate origin as the starting point; and
a first correcting unit, configured to correct each said moving direction and each said moving distance of the mobile electronic device relative to the starting point based on the angular velocity or the angle and the acceleration of the mobile electronic device; and
the first calculating unit calculates the coordinate values of the location of each obstacle according to corrected moving direction and corrected moving distance of the mobile electronic device relative to the starting point.

15. The apparatus for localization and mapping based on color block tags according to claim 10, wherein the apparatus further comprises:
a gyro sensor oran electronic compass and an accelerometer, configured to record an angular velocity or an angle and an acceleration of the mobile electronic device in real time respectively when the mobile electronic device traverses all over the area to be localized with the coordinate origin as the starting point; and
a first correcting unit, configured to correct each said moving direction and each said moving distance of the mobile electronic device relative to the starting point based on the angular velocity or the angle and the acceleration of the mobile electronic device;
the first calculating unit calculates the coordinate values of each obstacle according to corrected moving direction and corrected moving distance of the mobile electronic device relative to the starting point;
the second calculating unit calculates the coordinate values of the location of the other color block tag according to the corrected moving direction and the corrected moving distance of the mobile electronic device relative to the starting point.

16. The apparatus for localization and mapping based on color block tags according to claim 10, when the mobile electronic device has sensed tag information of any one of the color block tags by using a color sensor, the mobile electronic device is enabled to move in a direction in which strength of tag information of the color block tag is gradually increasing until the strength of the tag information of the color block tag sensed by the mobile electronic device is equal to or greater than a preset maximum value or the mobile electronic device collides with the color block tag, and then taking a current location of the mobile electronic device as the location of the color block tag; or
when the mobile electronic device has sensed tag information of any one of the color block tags by using a camera, the location of the color block tag relative to the mobile electronic device is determined based on number of pixels obtained by projecting a pattern of the color block tag onto a charge coupled device (CCD), thereby calculating the coordinate values of the color block tag; or
when the mobile electronic device read tag information of the color block tag by using a camera, enabling the mobile electronic device to move in a direction in which a pixel value obtained by projecting a pattern of the color block tag onto the charge coupled device (CCD) is gradually increasing until the pixel value obtained by projecting the pattern of the color block tag onto the charge coupled device (CCD) reaches a certain threshold or the mobile electronic device collides with the color block tag, and then taking a current location of the mobile electronic device as the location of the color block tag.

17. The apparatus for localization and mapping based on color block tags according to claim 10, wherein the apparatus further comprises:
a collision strategy unit, configured to enable the mobile electronic device to keep moving by avoiding an obstacle when the mobile electronic device has collided with the obstacle during the traversal according to a preset collision strategy;
the preset collision strategy is preferably:
enabling the mobile electronic device to retreat by M cm and rotate to the left/right by N° when a collision occurs, wherein 0<M<20, 0<N<10; and
the preset avoiding strategy comprises:
enabling the mobile electronic device to retreat by P cm and rotate to the left/right by Q° when the no-entry area is identified, wherein P is not less than the length of the boundary, 45≤Q≤90.

18. The apparatus for localization and mapping based on color block tags according to claim 10, wherein the apparatus is applicable for real-time mapping for an indoor area to be localized;
the color block tag is arranged on a left or right side wall of a door frame; or, a fixing groove is arranged on a left side or right side wall of a door frame, and the color block tag is set in the fixing groove.

19. An intelligent mobile device, wherein the intelligent mobile device comprises a mobile apparatus and the apparatus for localization and mapping based on color block tags as claimed in claim 10.

* * * * *